United States Patent [19]

Brown

[11] 4,349,868

[45] Sep. 14, 1982

[54] SAMPLED CONTROL LOOP WITH DYNAMIC GAIN OPTIMIZATION

[75] Inventor: Troy L. Brown, Loveland, Colo.

[73] Assignee: Hewlett-Packard Company, Palo Alto, Calif.

[21] Appl. No.: 162,221

[22] Filed: Jun. 23, 1980

[51] Int. Cl.³ .................. G05B 13/02; G05B 21/02
[52] U.S. Cl. ................................. 364/157; 318/561; 364/163; 364/179
[58] Field of Search ............... 318/561, 636; 364/105, 364/106, 111, 112, 118, 553, 148–152, 157, 160, 164, 165, 178, 179, 180, 183, 163

[56] References Cited

U.S. PATENT DOCUMENTS

| | | | |
|---|---|---|---|
| 3,230,351 | 1/1966 | Platt et al. | 318/636 X |
| 3,273,035 | 9/1966 | Inderhees | 318/636 X |
| 3,569,681 | 3/1971 | Koepcke | 364/111 X |
| 3,573,442 | 4/1971 | Andeen | 364/111 X |
| 4,218,733 | 8/1980 | Maselli | 318/561 X |
| 4,232,364 | 11/1980 | Bibbero | 318/636 X |

*Primary Examiner*—Joseph F. Ruggiero
*Attorney, Agent, or Firm*—Edward L. Miller

[57] ABSTRACT

A sampled control loop for controlling a process includes a gain optimizer that dynamically adjusts the loop gain transfer function in response to changes in any of the loop sampling interval, process time constants, or transducer propagation delay. The adjustment maintains optimal loop response in spite of those changes. The gain optimizer does this by approximating one or more gain functions which collectively determine the transfer function describing how a gain network generates a process control signal from an error signal.

22 Claims, 18 Drawing Figures

A SAMPLED CONTROL LOOP OPTIMIZED FOR m GAIN FUNCTIONS

FIG. 1 EXAMPLE OF CONVENTIONAL SAMPLED CONTROL LOOP

FIG. 2 AN OPTIMIZED VARIABLE SAMPLE RATE CONTROL LOOP

FIG. 3 A SAMPLED CONTROL LOOP OPTIMIZED FOR m GAIN FUNCTIONS

A PROCEDURE FOR FINDING THE GAIN FUNCTIONS OF FIG. 3

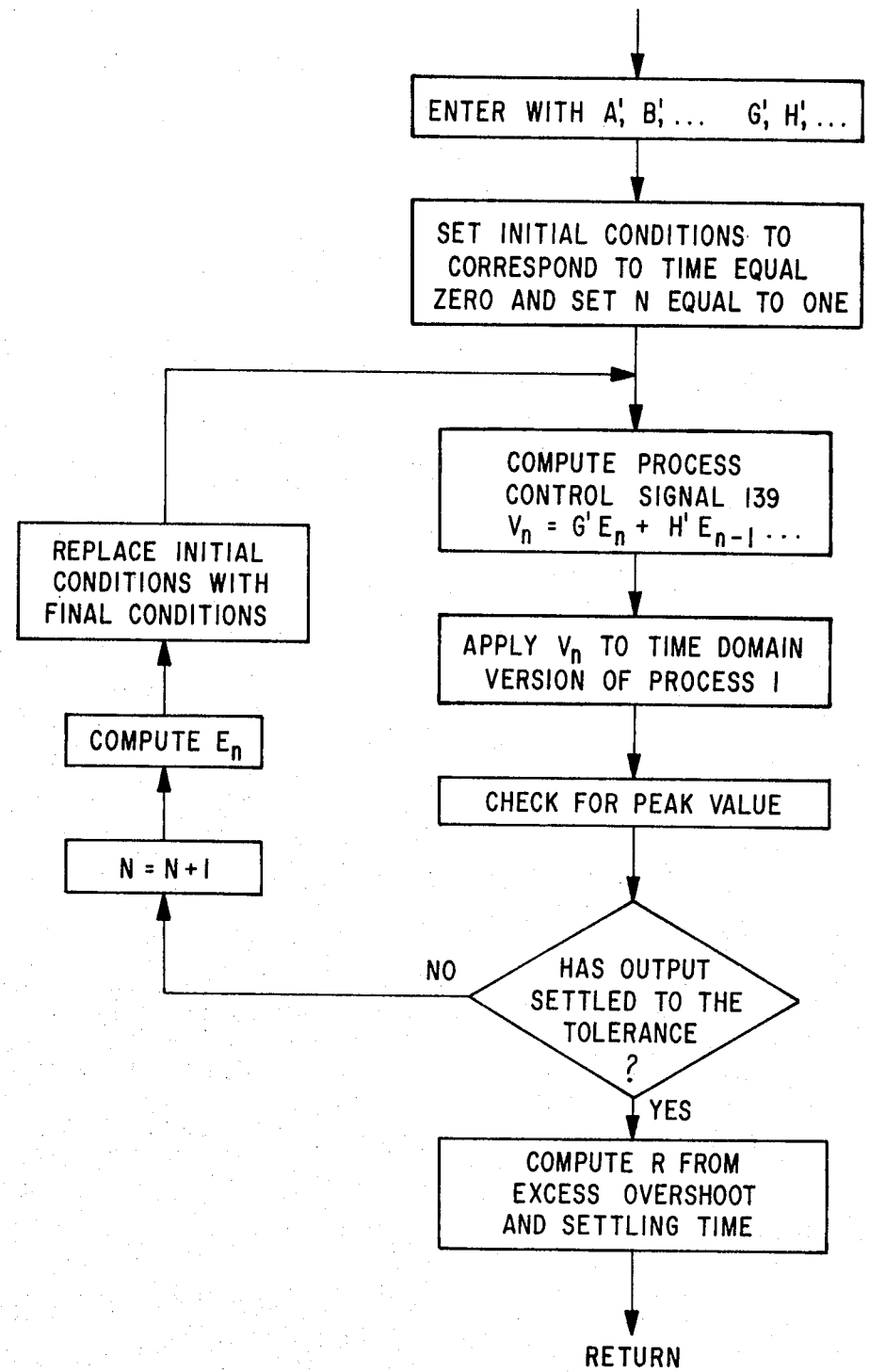
FIG. 5 A DIRECT METHOD FOR PREDICTING OVERSHOOT AND SETTLING TIME GIVEN A', B', ... G', H', ...

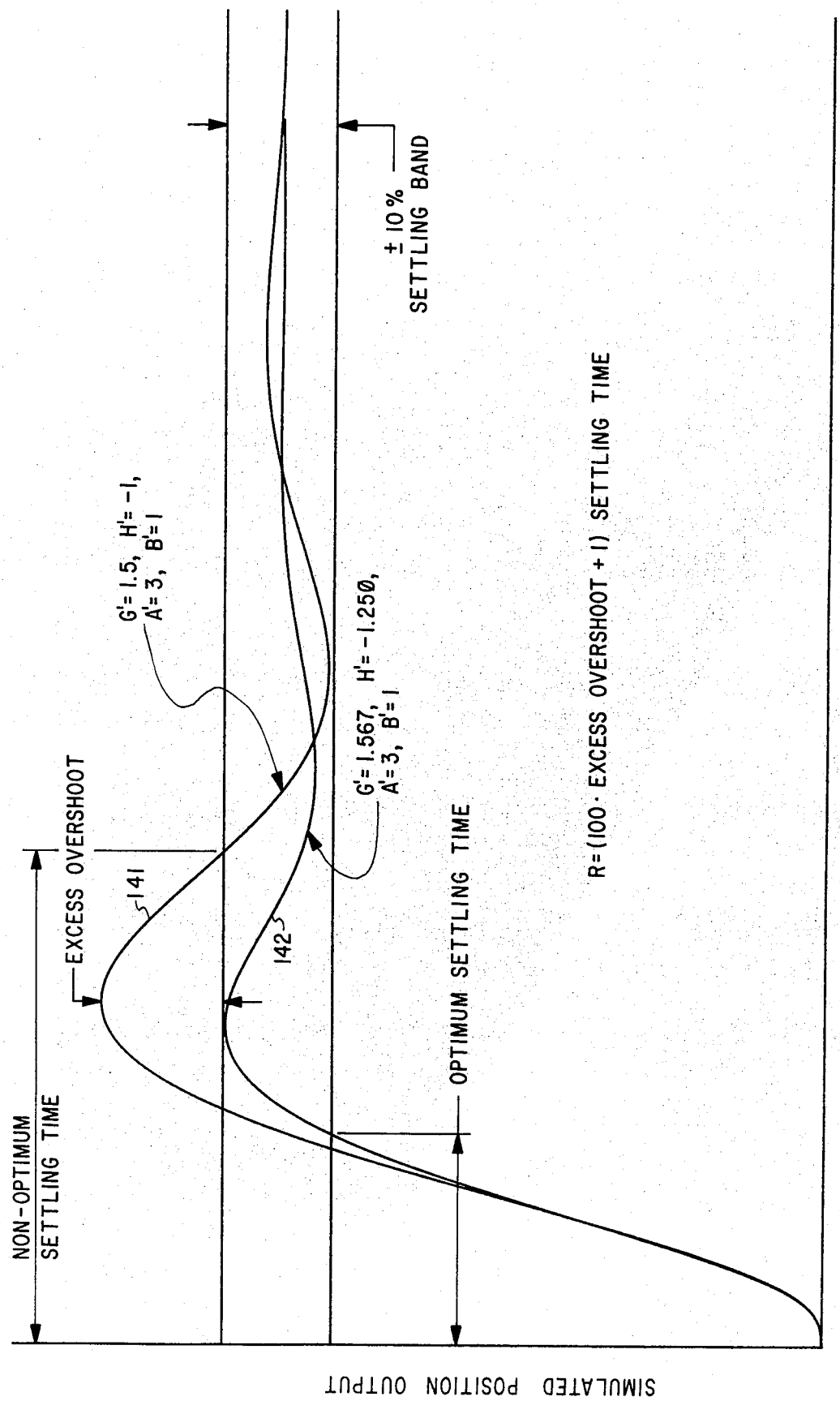
FIG. 6  AN EXAMPLE OF SIMULATED STEP RESPONSES USED TO PREDICT OVERSHOOT AND SETTLING TIME

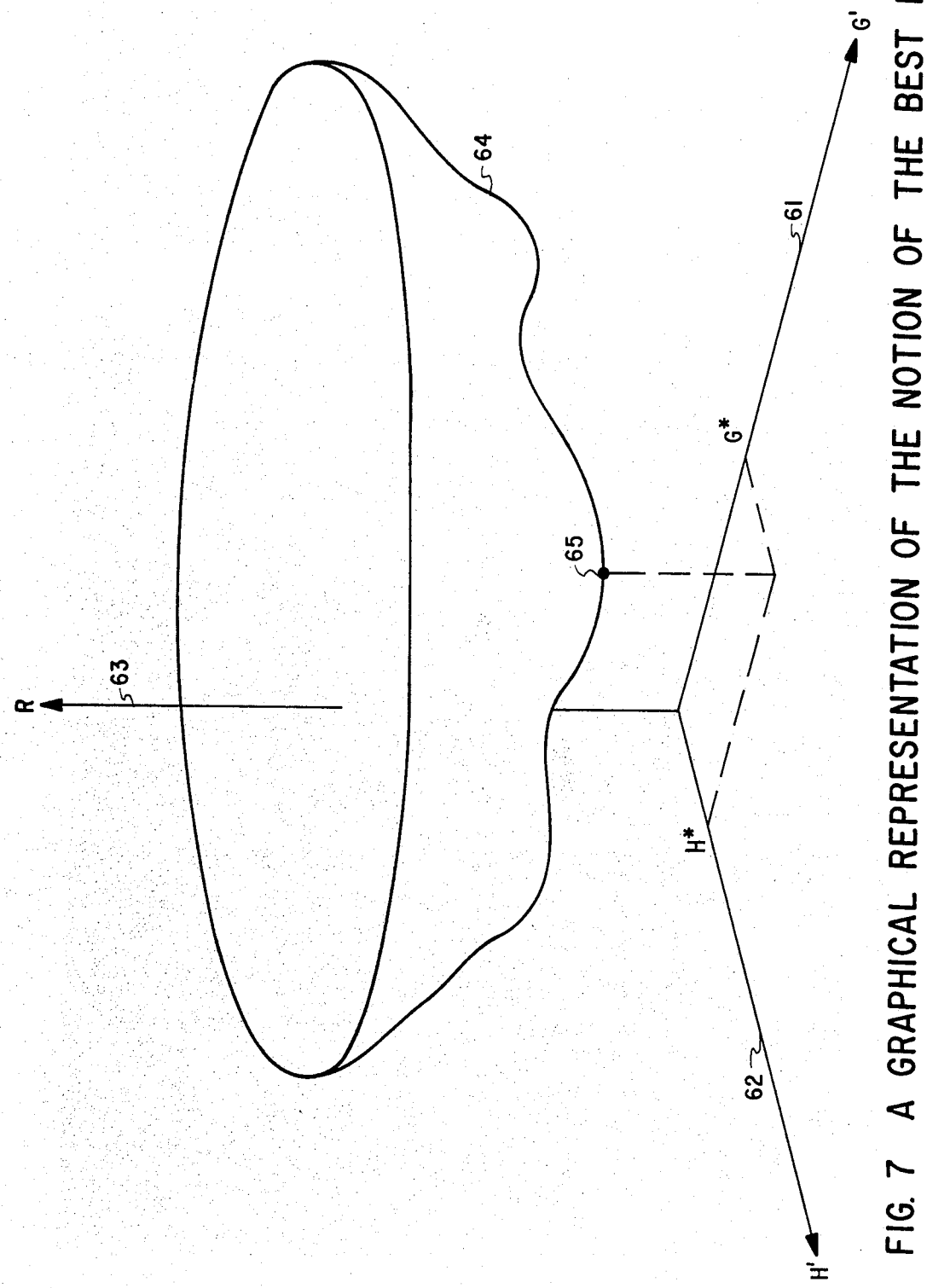
FIG. 7 A GRAPHICAL REPRESENTATION OF THE NOTION OF THE BEST R

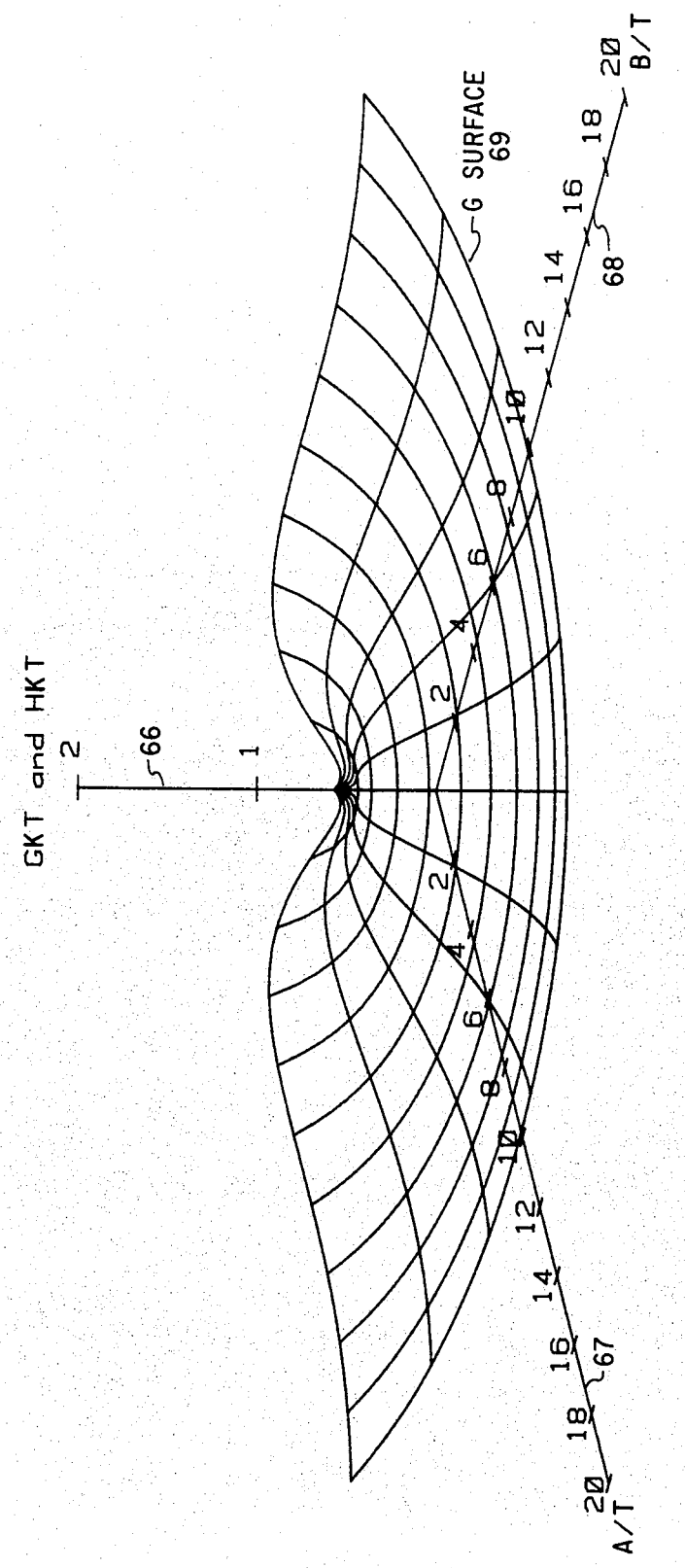
FIG. 8 A PLOT OF THE APPROXIMATED G FUNCTION

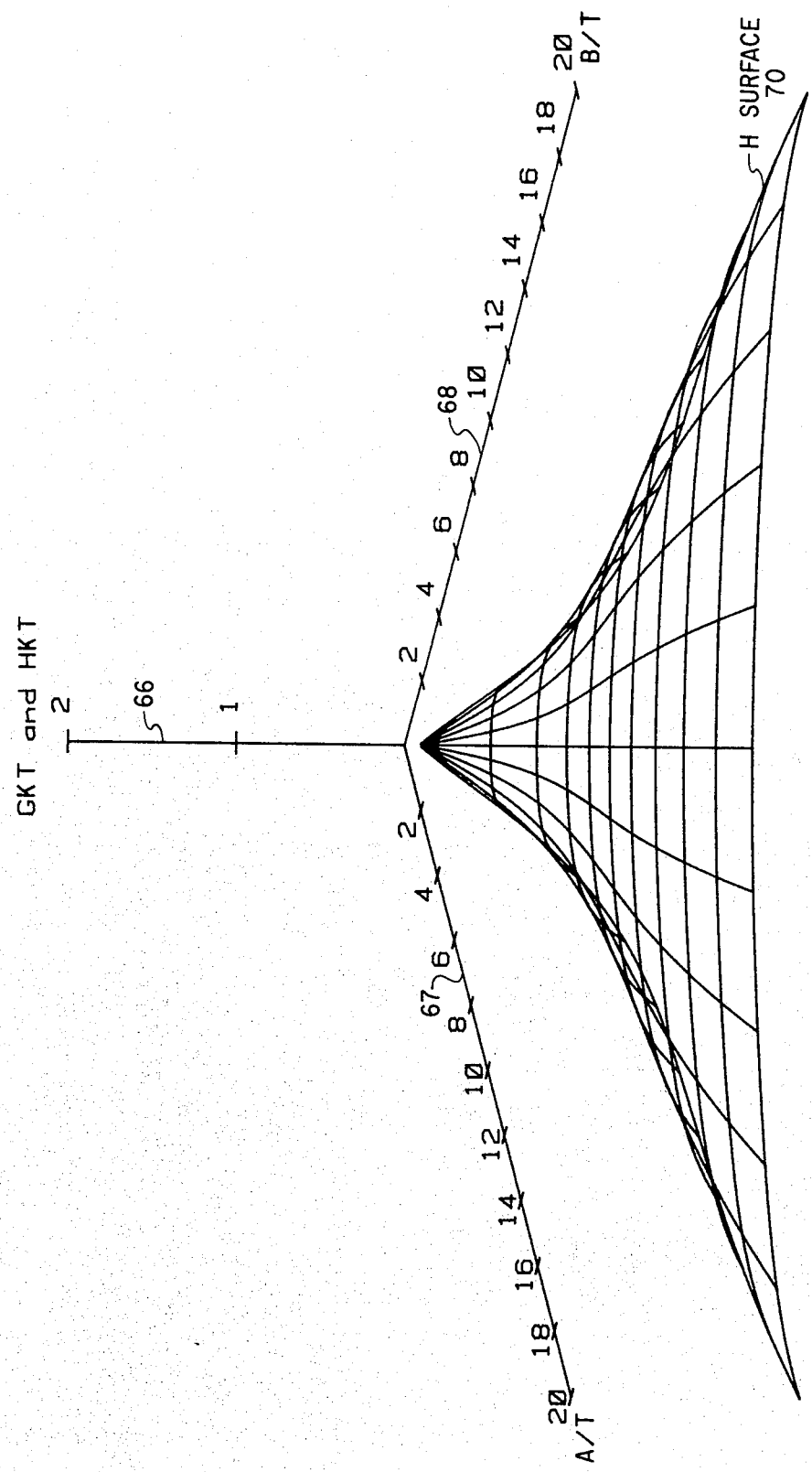
FIG. 9 A PLOT OF THE APPROXIMATED H FUNCTION

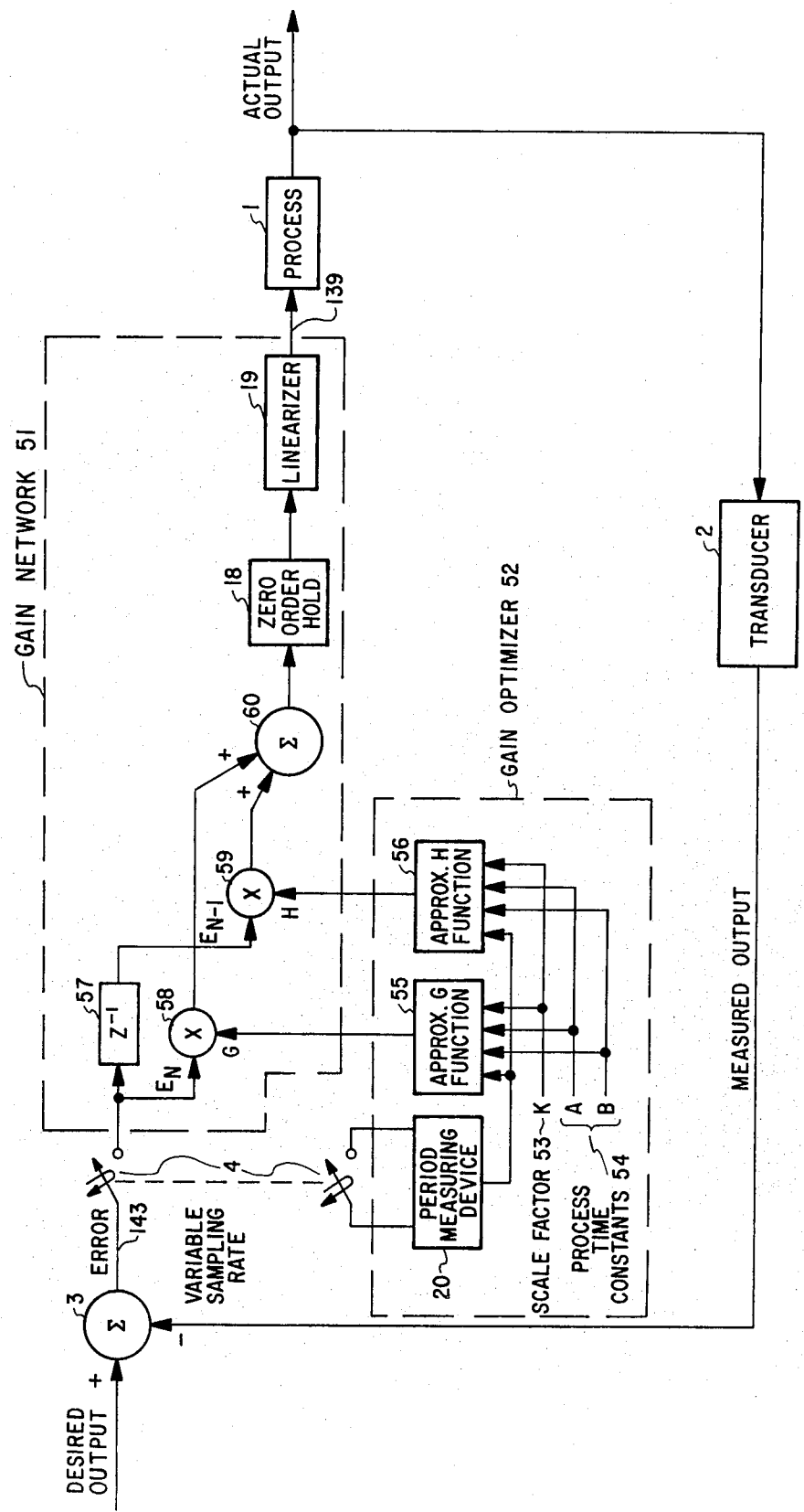
FIG. 10 A SAMPLED CONTROL LOOP OPTIMIZED FOR 2 GAIN FUNCTIONS

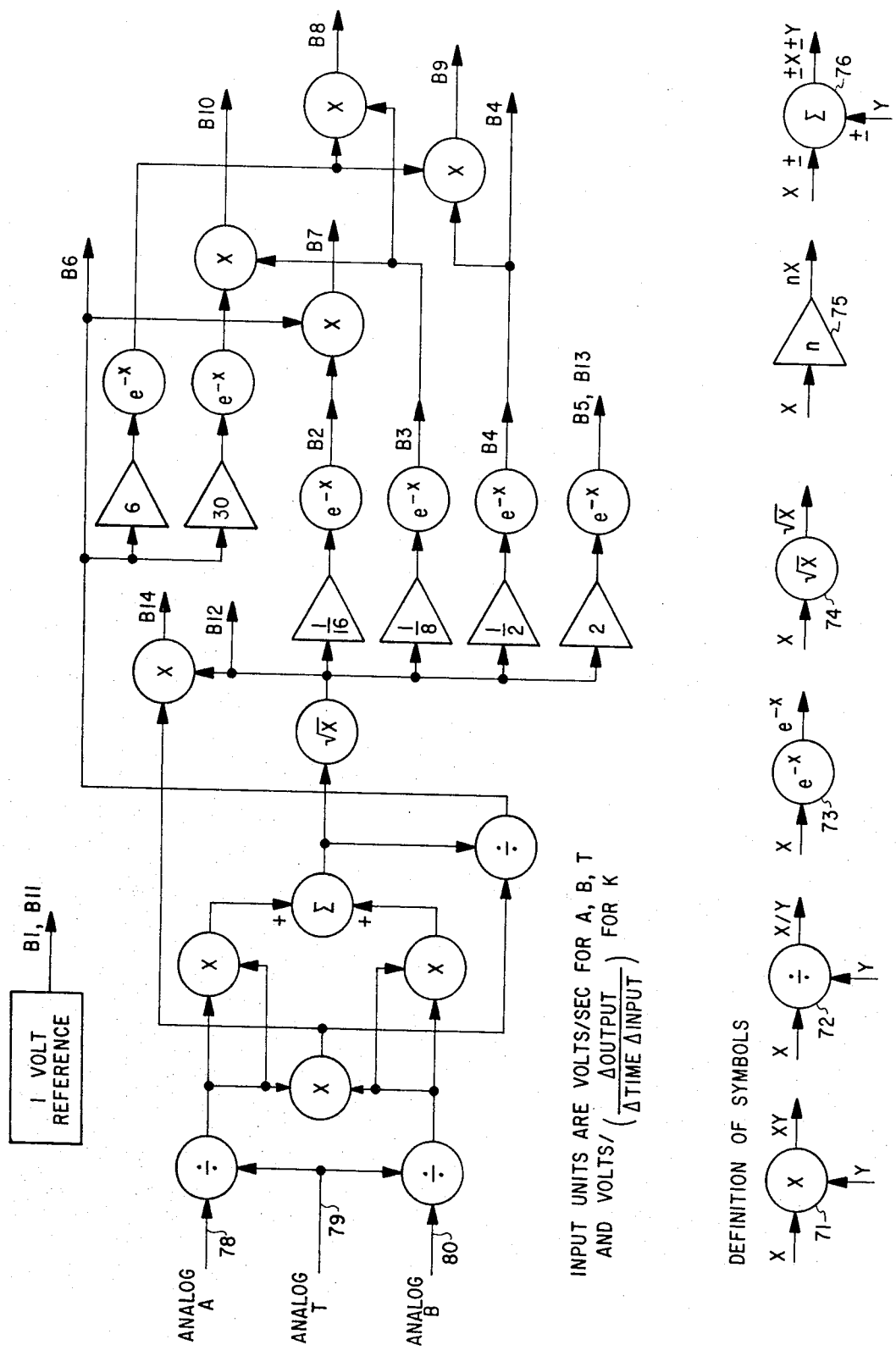
FIG. 11A FIRST PORTION OF AN ANALOG CIRCUIT TO APPROXIMATE G AND H FUNCTIONS

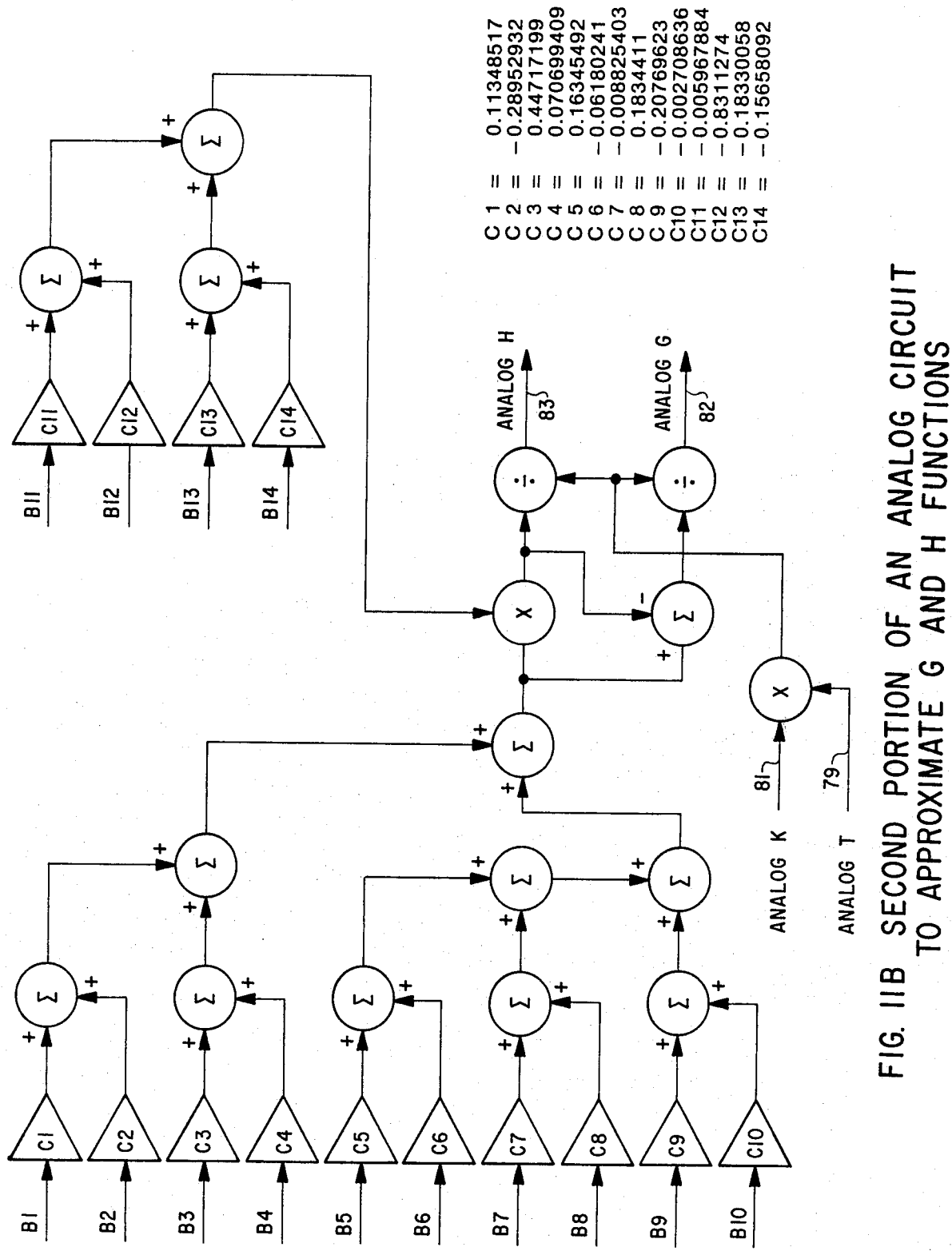
FIG. IIB SECOND PORTION OF AN ANALOG CIRCUIT TO APPROXIMATE G AND H FUNCTIONS

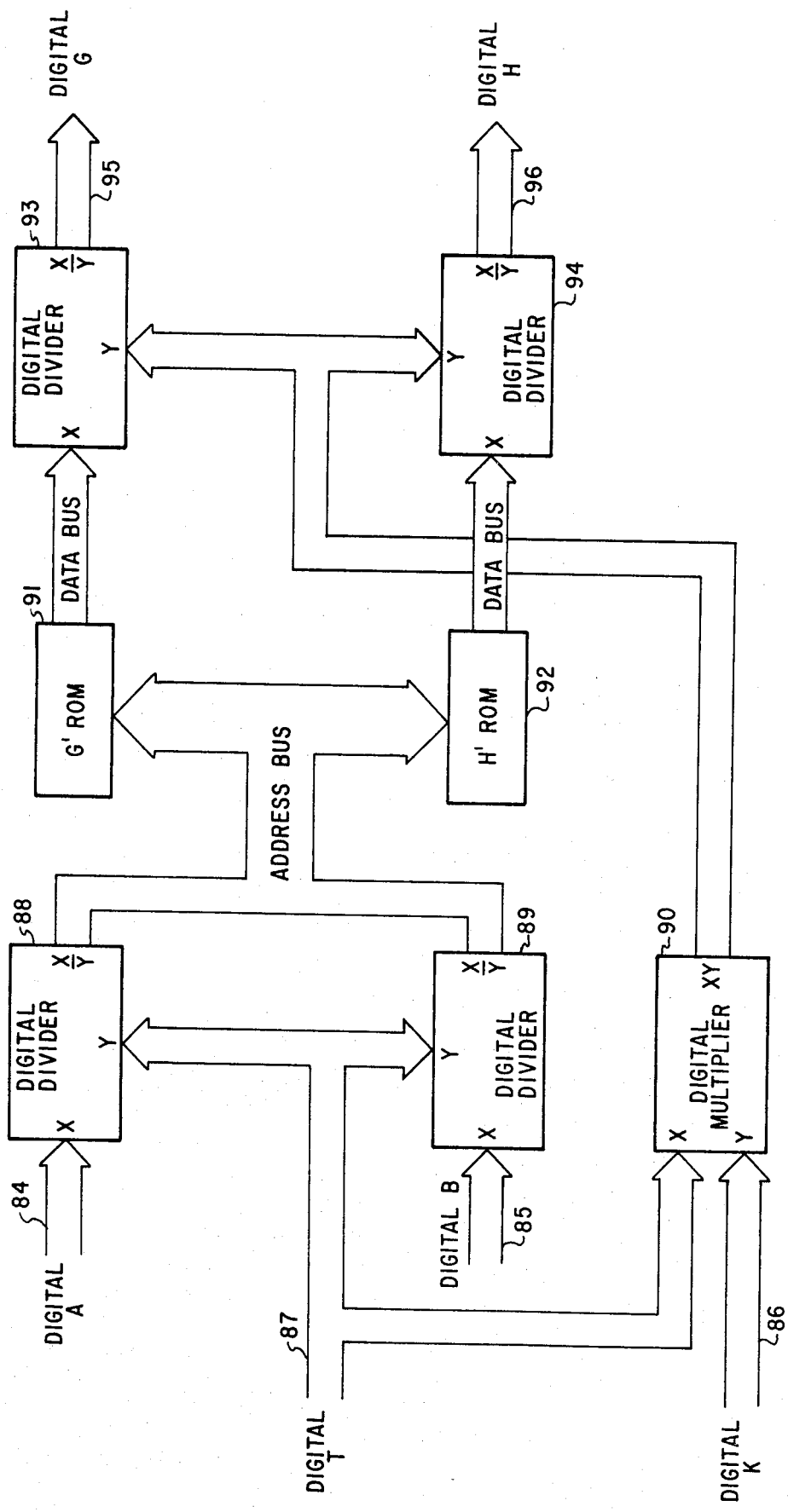
FIG. 12 A DIGITAL CIRCUIT TO APPROXIMATE G AND H FUNCTIONS

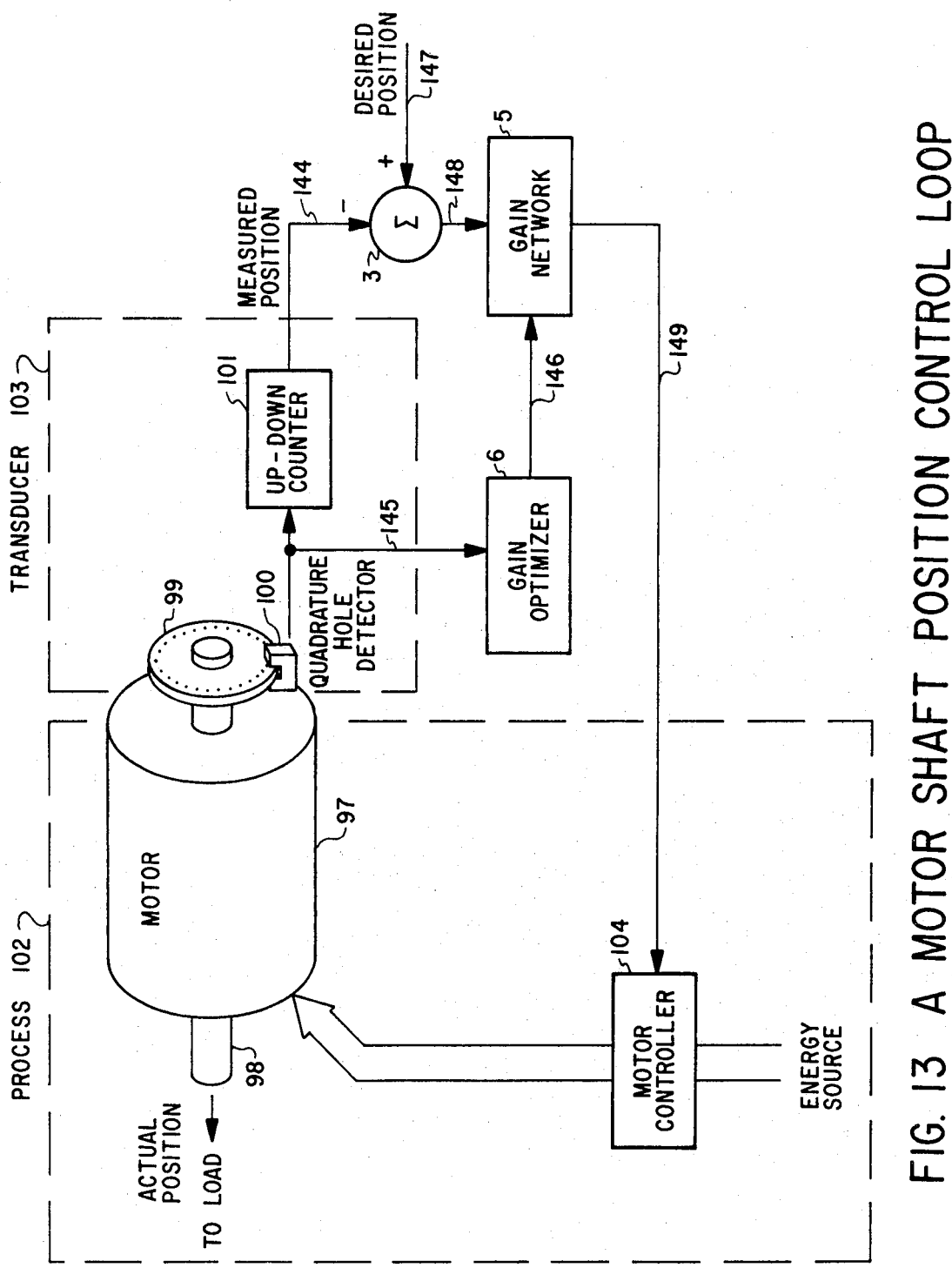
FIG. 13 A MOTOR SHAFT POSITION CONTROL LOOP

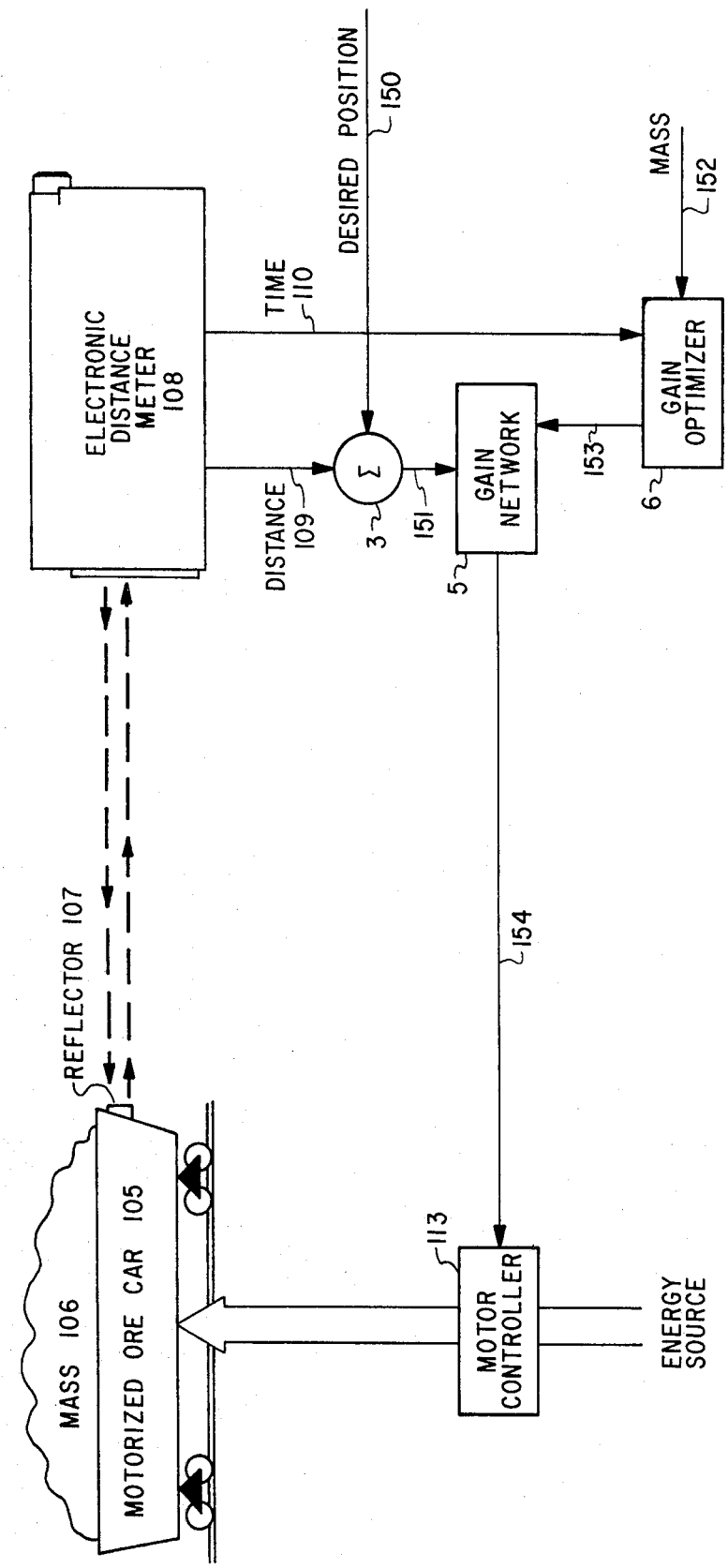
FIG. 14 AN ORE CAR POSITION CONTROL LOOP

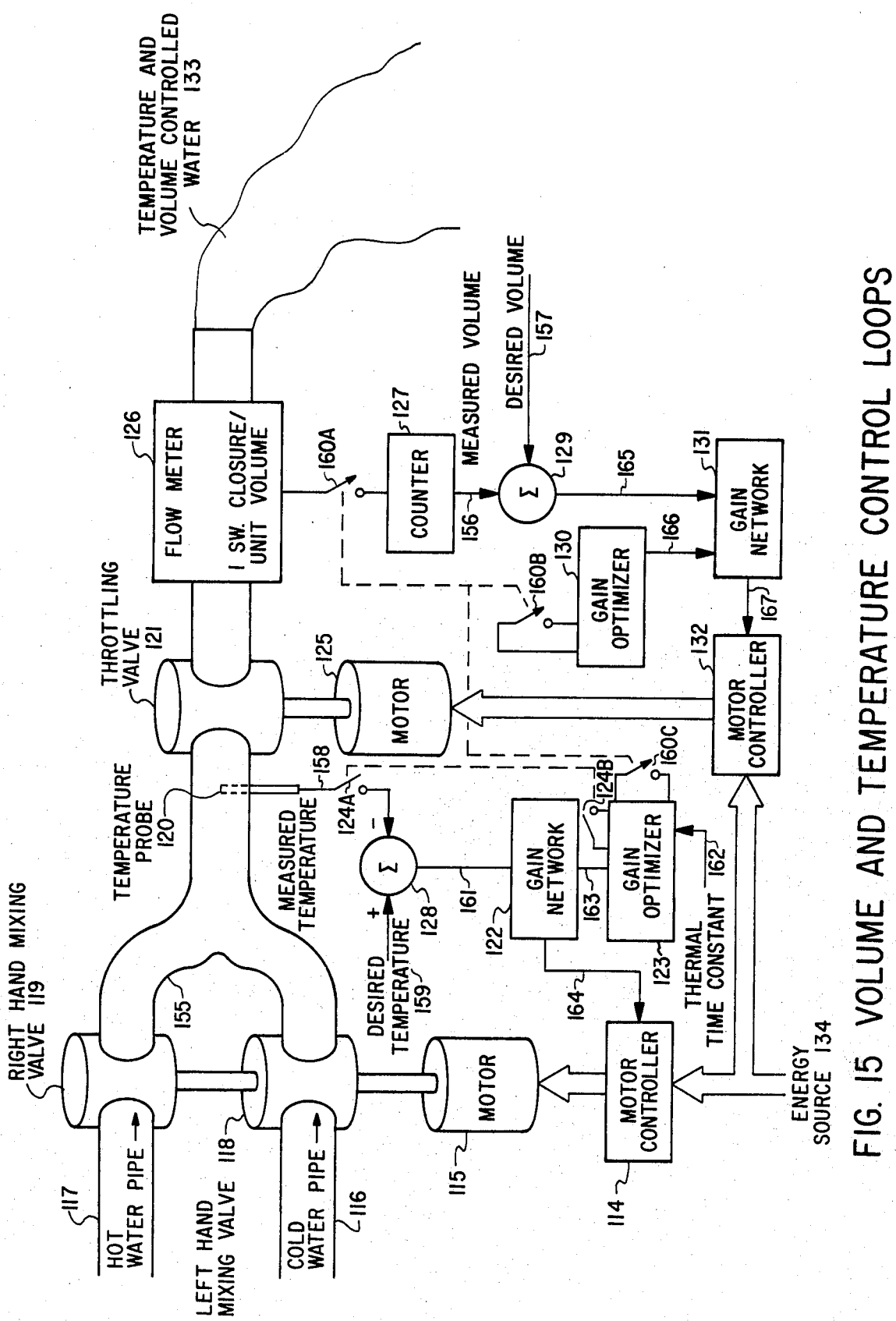
FIG. 15 VOLUME AND TEMPERATURE CONTROL LOOPS

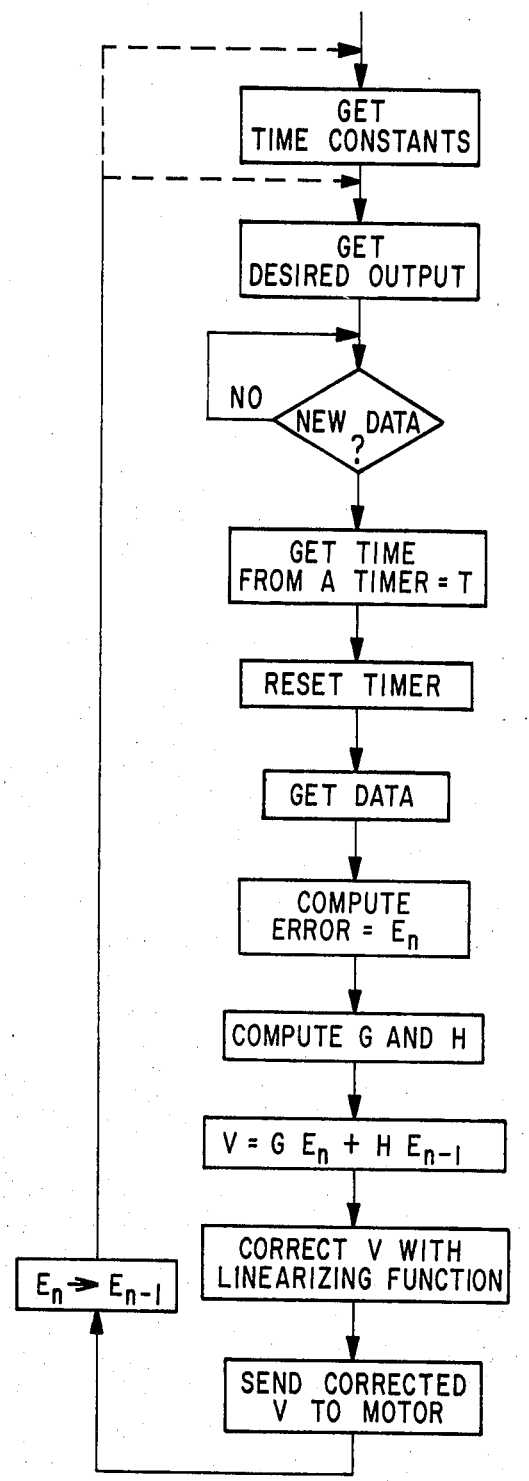
FIG. 16 A COMPUTER FLOWCHART FOR THE PREVIOUS 3 CONTROL LOOP EXAMPLES

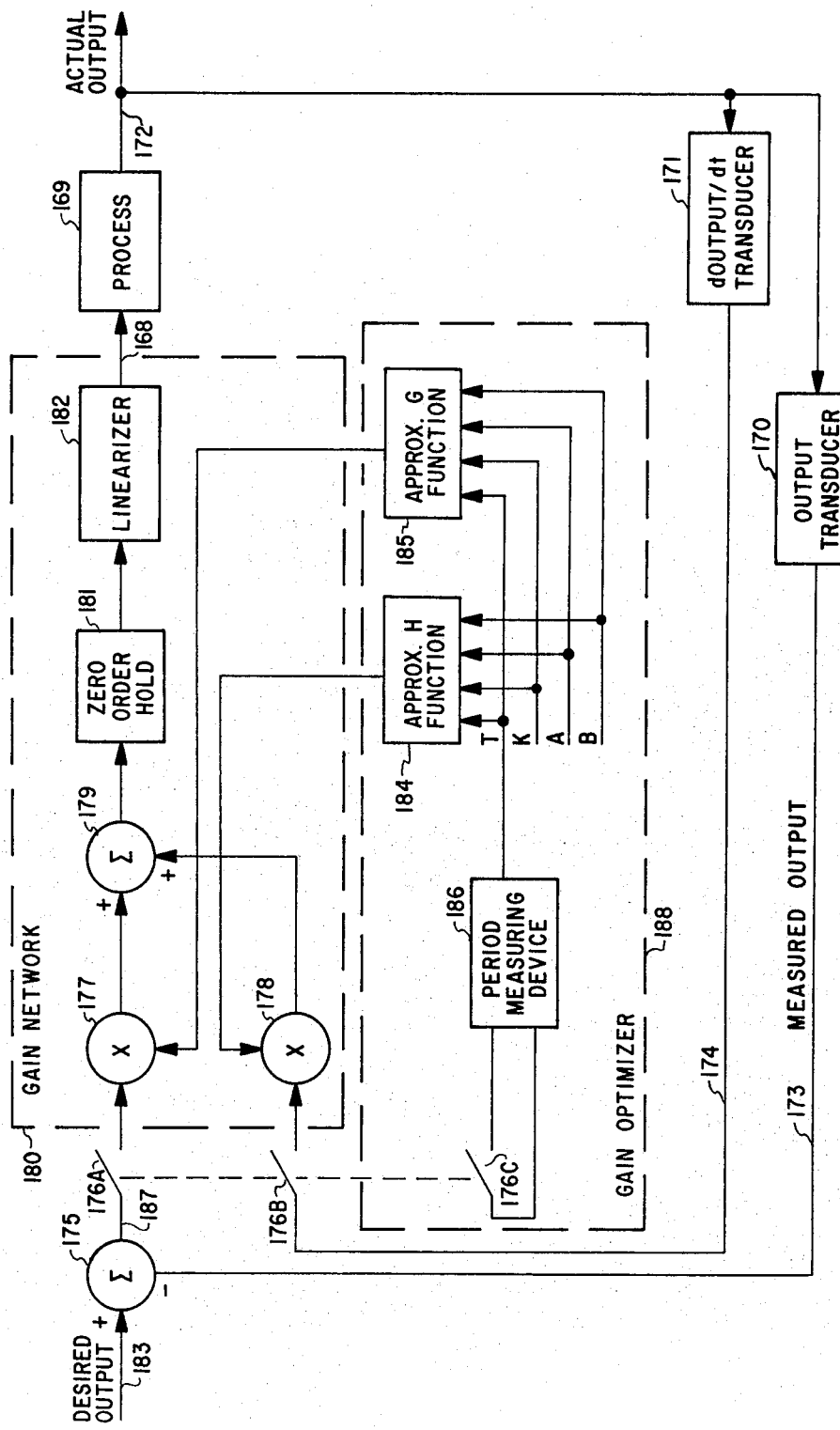
FIG. 17 GAIN OPTIMIZED SAMPLED CONTROL LOOP WITH MULTIPLE TRANSDUCERS

SAMPLED CONTROL LOOP WITH DYNAMIC GAIN OPTIMIZATION

BACKGROUND AND SUMMARY OF THE INVENTION

Conventional sampled control loop for controlling a process can be designed to provide an optimal response provided the consecutive sampling intervals for the loop as well as the time constants and propagation delays associated with the process are each constant. However, not all transducers for monitoring the output of a process produce outputs at constant time invervals. Furthermore, the time constants associated with a process may change dynamically as a function of load conditions or as a result of interaction with cooperating processes.

FIG. 1 illustrates a sampled control loop which is representative of the prior art. A sampling switch 10 opens and closes at a fixed sampling rate. A gain element 14 provides position feedback, a delay element 12 and a gain element 15 provide velocity feedback, and a delay element 13 and a gain element 16 provide acceleration feedback. This progression can be continued to provide jerk feedback, etc., for as many gain elements and delay elements as desired. A zero order hold circuit 18 converts the impulse output of a summing junction 17 to step-like signals which are more compatible with realistic systems such as motors. A linearizer 19 makes the process 7 look like a linear process if it is proportional but nonlinear. The gains of gain elements 14, 15, and 16 are dependent on the sampling rate, the scale factor and the time constants of the process 7. Gain elements 14, 15, and 16 can be determined experimentally or by a computer aided optimization technique. The control loop of FIG. 1 has the disadvantage that if the sampling rate changes, or if the scale factor of process 7 changes, or any of the time constants change, the response loop is no longer optimized. To maintain optimum response necessitates reoptimizing by the methods previously mentioned. Situations that do not allow the time necessary to reoptimize cannot be maintained at peak efficiency. Furthermore, such control loops cannot remain optimized in the face of dynamic changes in any of the aforementioned variables.

It would be desirable if a sampled control loop were designed to maintain a desired optimal response regardless of dynamic changes in the sampling interval for the loop, the time constant for the process, or the propagation delay for the transducer.

It can be shown for any particular type of loop response deemed optimal that there exist gain control functions corresponding to the gain elements 14, 15, 16, . . . These gain control functions have the loop sampling interval, process time constants and (possibly) transducer propagation delay, as independent variables. If each of gain elements 14, 15, 16, . . . , provided a gain in accordance with the value of its associated gain control function then the response of the loop would remain optimal even though there were dynamic changes in the independent variables for the functions.

In a preferred embodiment of the invention to be discussed below a gain optimizer responds dynamically to the aforementioned variables through approximating functions whose values control the degree of gain provided by gain elements corresponding to 14, 15, 16, . . .

The gain optimizer implements approximating functions rather than the actual gain control functions because the latter are extremely difficult, or in many cases impossible, to derive analytically. The analytical derivation of the actual gain control functions involves solving for the roots of a polynomial of degree one higher than the total number of independent variables allowed to vary dynamically. As is well known, no general closed form solutions exist for polynomials of degree five or higher. And even where the closed form solution for the polynomial does exist the manner in which roots are used while finding the actual set of gain control functions is extremely cumbersome.

It is shown in connection with a preferred embodiment of the invention that a collection of approximating functions can be defined by operationalizing the definition of optimal response and then allowing the independent variables to assume a wide range of values. In this way is found a collection of numerical values that each actual gain control function ought to provide. These values can either be condensed into a look-up table for use in the gain optimizer, or modeled to a desired degree of accuracy by a compact set of approximating functions specifically choosen for that purpose.

BRIEF DESCRIPTION OF THE DRAWINGS

FIG. 5 is a flow chart for finding a figure of merit for trial values of approximations for the optimizing functions.

FIG. 6 is a graphical illustration of the principle used to define the concept of figure of merit used in FIG. 5.

FIG. 7 is a graphical illustration of how the approximating functions and the figure of merit are related.

FIG. 8 is a plot of the approximation for the G gain optimization function.

FIG. 9 is a plot of the approximation for the H gain optimization function.

FIG. 10 is a detailed block diagram of a sampled control loop having a gain optimizer that produces approximations for two gain optimization functions in response to a variable sampling interval, a scale factor and two time constants.

FIGS. 11A and 11B are generalized schematics for an analog method for implementing the approximating G and H gain functions associated with FIG. 10.

FIG. 12 is a block diagram of a digital method of implementing the approximating G and H gain functions associated with FIG. 10.

FIG. 13 is a block diagram of an example motor-actuated velocity process controllable with the circuit of FIG. 2.

FIG. 14 is a block diagram of an example motor-actuated position process controllable with the circuit of FIG. 2.

FIG. 15 is a block diagram of an example motor-actuated temperature process nested within and interacting with a motor-actuated volume process, wherein each process is controllable with the circuit of FIG. 2.

FIG. 16 is a flow chart for a method of implementing the sampled control loop shown in FIG. 2 using a microprocessor or computer.

FIG. 17 is a block diagram of an alternate embodiment of a sampled control loop including a gain optimizer.

DESCRIPTION OF THE PREFERRED EMBODIMENT

Figure 2:
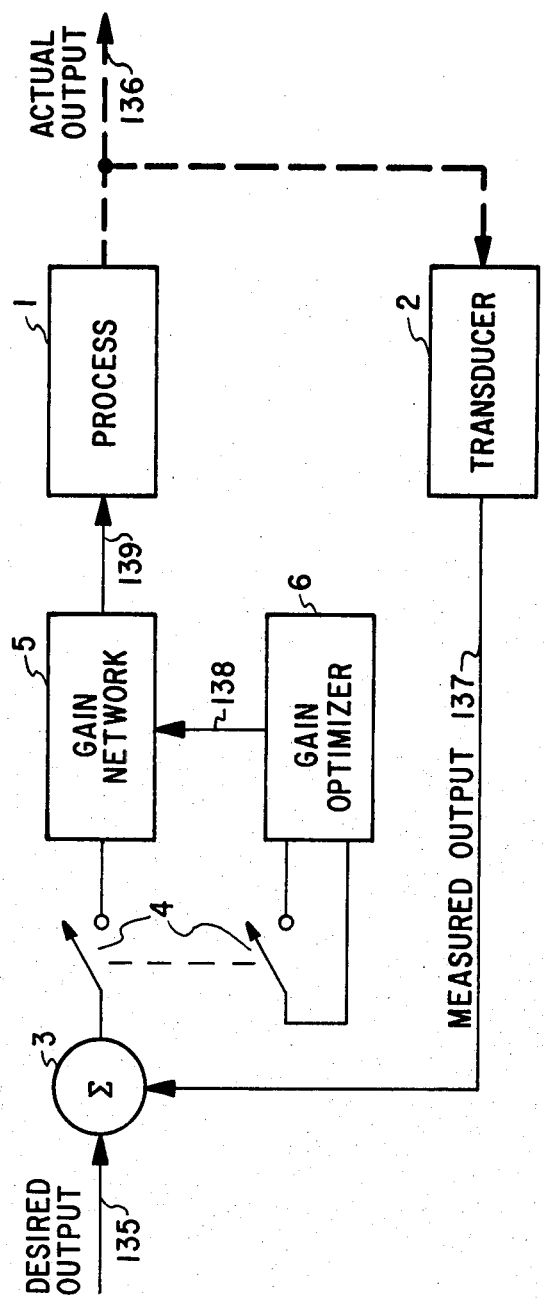
FIG. 2 is a simplified block diagram of a sampled control loop incorporating a gain optimizer that allows the sample rate to vary.

FIG. 2 shows a sampled control loop constructed in accordance with a preferred embodiment of the invention. The control loop of FIG. 2 includes a summing junction 3 receiving a signal 135 representing the desired output from a process 1, and also receiving a signal 137 representing the measured output from the process 1 as obtained by a transducer 2. The output from the summing junction 3 is applied to a first portion of a sampling mechanism 4 which periodically samples the output at convenient time intervals which need not be equal. A second portion of sampling mechanism 4 supplies time interval information to a gain optimizer circuit 6. A gain network 5 receives from the first portion of the sampling mechanism 4 the sampled output of the summing junction 3. The gain network circuit 5 also receives gain information 138 determined by the gain optimizer circuit 6. The gain network circuit 5 produces a process control signal 139 which actuates the process 1. Process 1 may be any sort of process wherein a change in the value of the process control signal 139 results in a monotonically related change in "something." "Something" may be a voltage, physical displacement, temperature, etc., and is represented by an actual output 136. The transducer 2 is coupled to the actual output 136 in order to produce the measured output 137, as previously described.

Processes usable with the sampled control loop of FIG. 2 include those whose Laplace transform of their impulse response (S-domain impulse response) are or are approximated by either:

$$\frac{Out(s)}{In(s)} = \frac{Kab\ldots}{s(s+a)(s+b)\ldots} \text{ or } = \frac{Kab\ldots}{(s+a)(s+b)\ldots}$$

where:
the symbol s is the Laplace transform derivative operator d/dt;
Out(s) is the Laplace transform of the actual output 136;
In(s) is the Laplace transform of the process control signal 139;
K is a scale factor of proportionality; and
a, b, . . . are inverse time constants of process 1.

Figure 1:
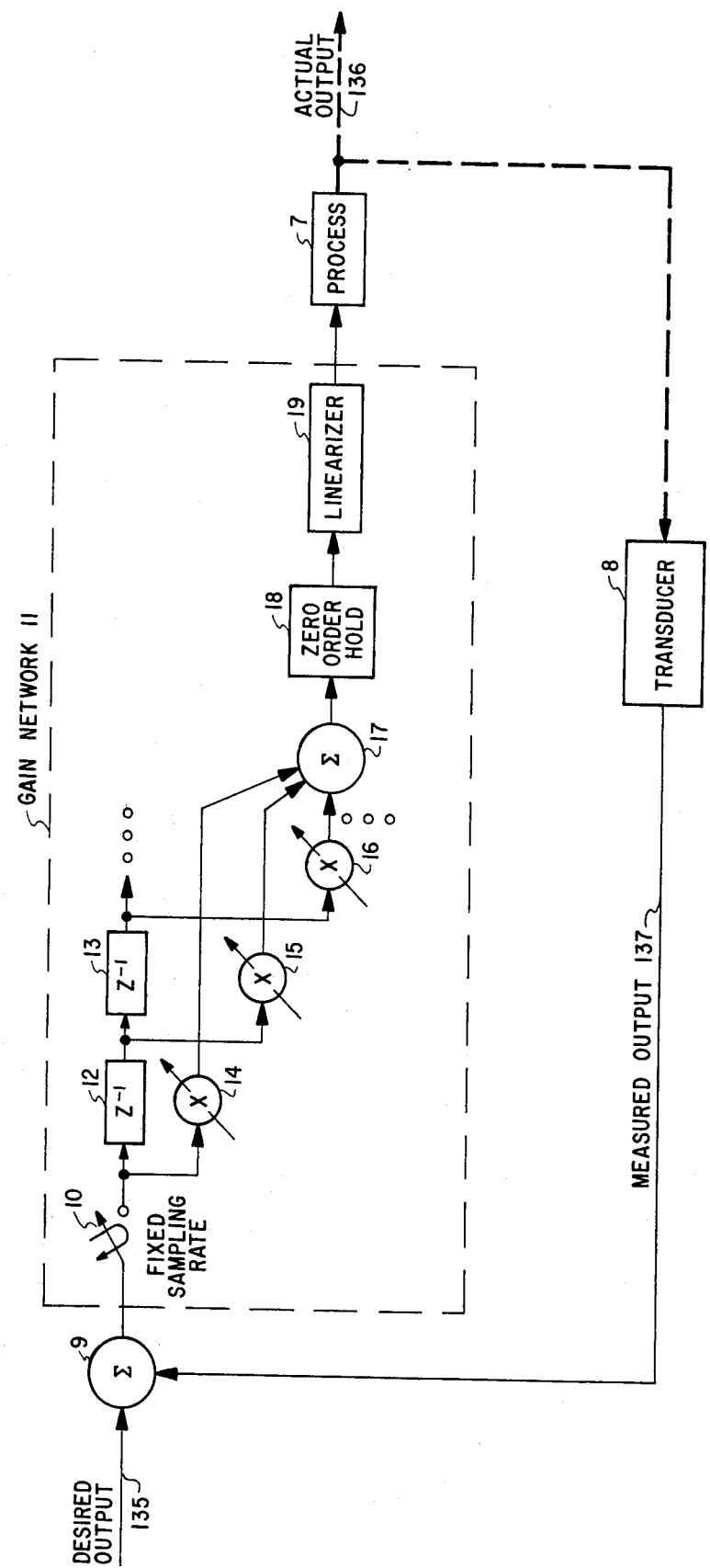
FIG. 1 is a block diagram of a conventional sampled control loop.

If the nature of the process is such that its proportionality factor (K) is not inherently constant with respect to the process control signal 139 then a linearizer circuit such as the linearizer 19 in FIG. 1 may be used to render K effectively constant. Accordingly, it will be convenient henceforth to assume K is constant. The symbol K is also called the scale factor.

The symbols, a, b, . . . are inverse system time constants representing the inverses of process time constants A, B, . . . That is:

$$a=1/A, B=1/B,\ldots$$

Examples of processes usable with the sampled control loop of FIG. 2 include motor driven objects (refer to FIGS. 13 and 14), flow related process and temperature related processes (refer to FIG. 15), and rocketry.

The operation of the sampled control loop of FIG. 2 is as follows. A mechanism (not shown) supplies a signal 135 indicative of the desired output from the process 1. The summing junction 3 develops an error signal determined by the difference between the desired output 135 and the actual output 136. The gain network 5 produces the process control signal 139 which in turn causes the process 1 to change the actual output 136 in a direction that reduces the error signal determined by the summing junction 3.

The gain optimizer 6 controls the response of the actual output 136 to a change in the value of the desired output signal 135 by providing a particular relationship between the input and output signals for the gain network 5. In the simplest case that relationship is a simple linear gain, possibly in series with a zero order hold circuit. In more complex cases, such as discussed in connection with FIGS. 3 and 10 below, the relationship involves the summation of a plurality of different gains each associated with different time delays, and is best described as a transfer function rather than as a "gain." The gain optimizer 6 determines the gain or transfer function of the gain network 5 as a function of at least two quantities, even if those quantities are constant. Those quantities are the time interval between samples (determined by the sampling mechanism 4) and the scale factor K. In addition, the gain optimizer 6 can also include process time constants A, B, . . . as input variables for the determination of the gain or the transfer function.

The gain optimizer 6 provides this control of the input/output relationship for the gain network 5 in an ongoing dynamic manner. Under the proper circumstances any of the input variables to the gain optimizer 6 may change dynamically while the control loop is in operation, and the gain optimizer 6 will adjust the gain or transfer function to preserve the particular desired/actual response desired.

The "proper circumstances" referred to in the previous paragraph are these. If rapid excursions in the value of the time interval associated with the sampling mechanism 4 can occur the gain network 5 (as shown below in FIG. 3) must be restricted to one delay element 26 and two multiplier elements 28 and 29. Such a circuit is shown in FIG. 10. However, if the rate of change in the value of the time interval is small with respect to the sampling rate, and if dynamic changes in any other variables, such as a process time constant or the scale factor, are slow with respect to the sampling rate, then no such limitation on the number of such delay and multiplier elements is required.

The designer of a sampled control loop for a particular process identifies an optimum desired/actual response. The notion of optimum may involve the selection of a tolerance allowable for the amount of overshoot in the actual output and/or the selection of a tolerance for the response time. These tolerances may also be dynamic input variables to the gain optimizer 6. Likewise, the propagation delay in the transducer 2 may be a dynamic input variable.

Figure 3:
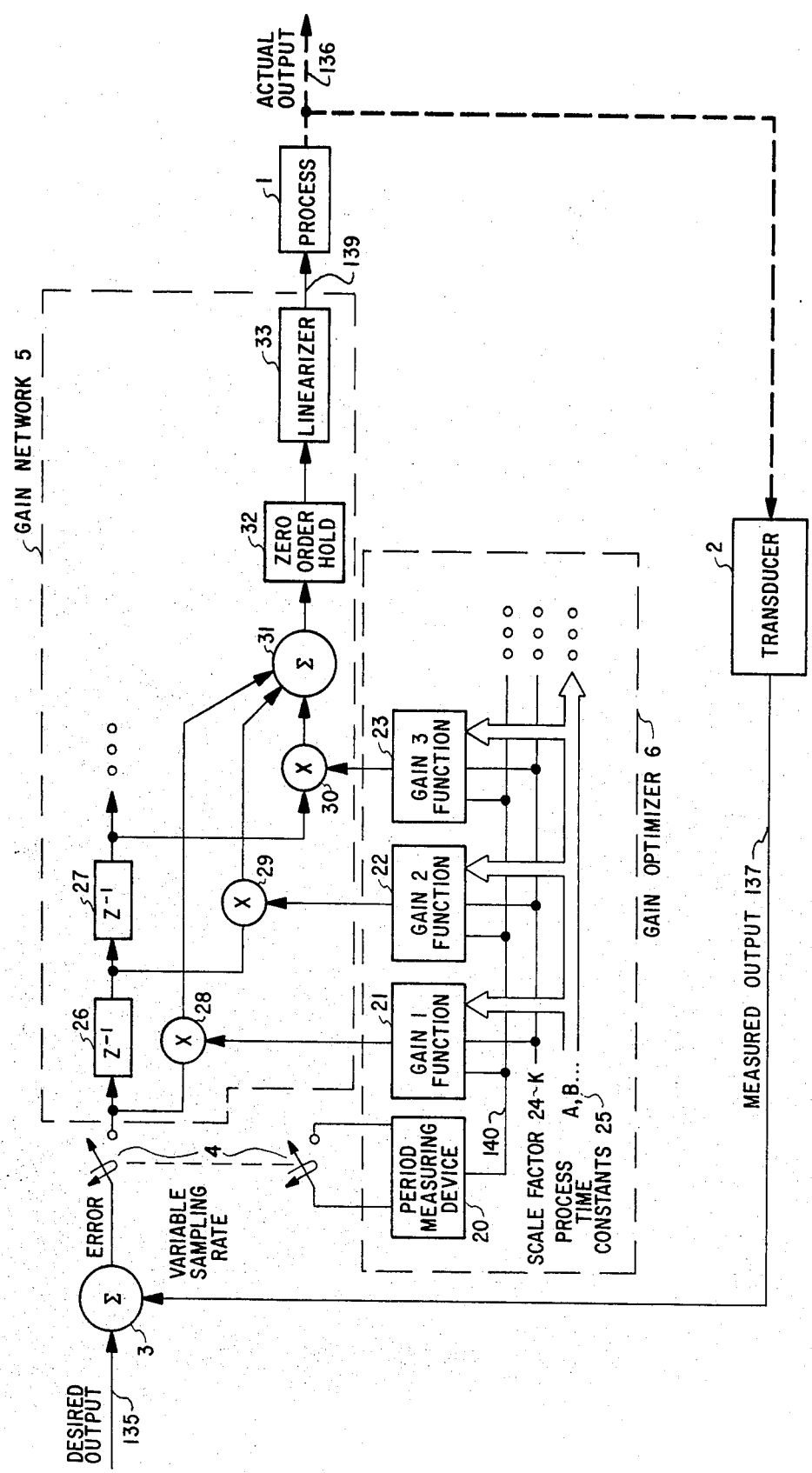
FIG. 3 is a more detailed block diagram of the sampled control loop of FIG. 2.

FIG. 3 is a more detailed version of the sampled control loop of FIG. 2. In particular, the nature of the gain network 5 and the gain optimizer 6 is shown in detail.

The error signal from the summing junction 3 may be provided in either analog or digital form. Within the gain network 5 the error signal from the summing junction 3 is coupled to a consecutive series of delay elements 26, 27, ... The input to each delay element 26, 27, ... is also coupled to an associated multiplier element 28, 29, 30, ... each of whose outputs are collected and summed by a summing element 31. The factor by which each of the multiplier elements multiplies is determined according to the value present at another input to each of those multiplier elements. The output of the summing element 31 is applied to a zero order hold circuit 32, whose output is in turn applied to a linearizer circuit 33. The output of the linearizer circuit 33 is the aforementioned process control signal 139.

The zero order hold circuit 32 is shown following the summing element 31, as is customary in texts concerning sampled control loops. It will be understood by those skilled in the art that in any particular circuit the zero order hold function can generally be performed by a circuit element in a different location. For example, in an analog embodiment the zero order hold function might be performed by a sample and hold circuit coupled to the sampling mechanism 4. In a digital embodiment the continuing presence of bits in their registers would provide the zero order hold function.

The linearizer circuit 33 is needed if the "raw scale factor" associated with the process 1 is not a constant. That is, if the actual output 136 is not always proportional to the process control signal 139 through a fixed constant of proportionality. In such a case the scale factor K would not be constant. By the addition of a suitable linearizer circuit 33 K becomes constant even though the "raw scale factor" is not.

Within the gain optimizer 6 a period measuring device 20 responds to the sampling mechanism 4. The resulting measured period information 140, along with the value 24 of the scale factor K and the values 25 of the process time constants A, B, ..., are each supplied to a plurality of gain function elements 21, 22, 23, ... Each gain function element produces an output that determines the multiplication factor of an associated multiplier element in gain network 5.

The operation of the gain network 5 and gain optimizer 6 of the sampled control loop of FIG. 3 is as follows. Assume that a previous selection of an optimum desired/actual response has been performed. It can be shown that, for a given number of input variables, such a selection uniquely determines the various gain functions. The gain function elements 21, 22, 23, ... represent those gain functions and cooperate to vary the multiplication factor of the multiplier elements 28, 29, 30, ..., respectively, such that the resulting transfer function for the gain network 5 actuates the process 1 with the desired optimum response. The outputs of the gain function elements 21, 22, 23, ... are truly functions of their inputs, so that the desired/actual response of the process 1 remains optimized even though there may be dynamic changes in the sampling rate, the scale factor, the process time constants, or any other input to the gain function elements.

Figure 4:
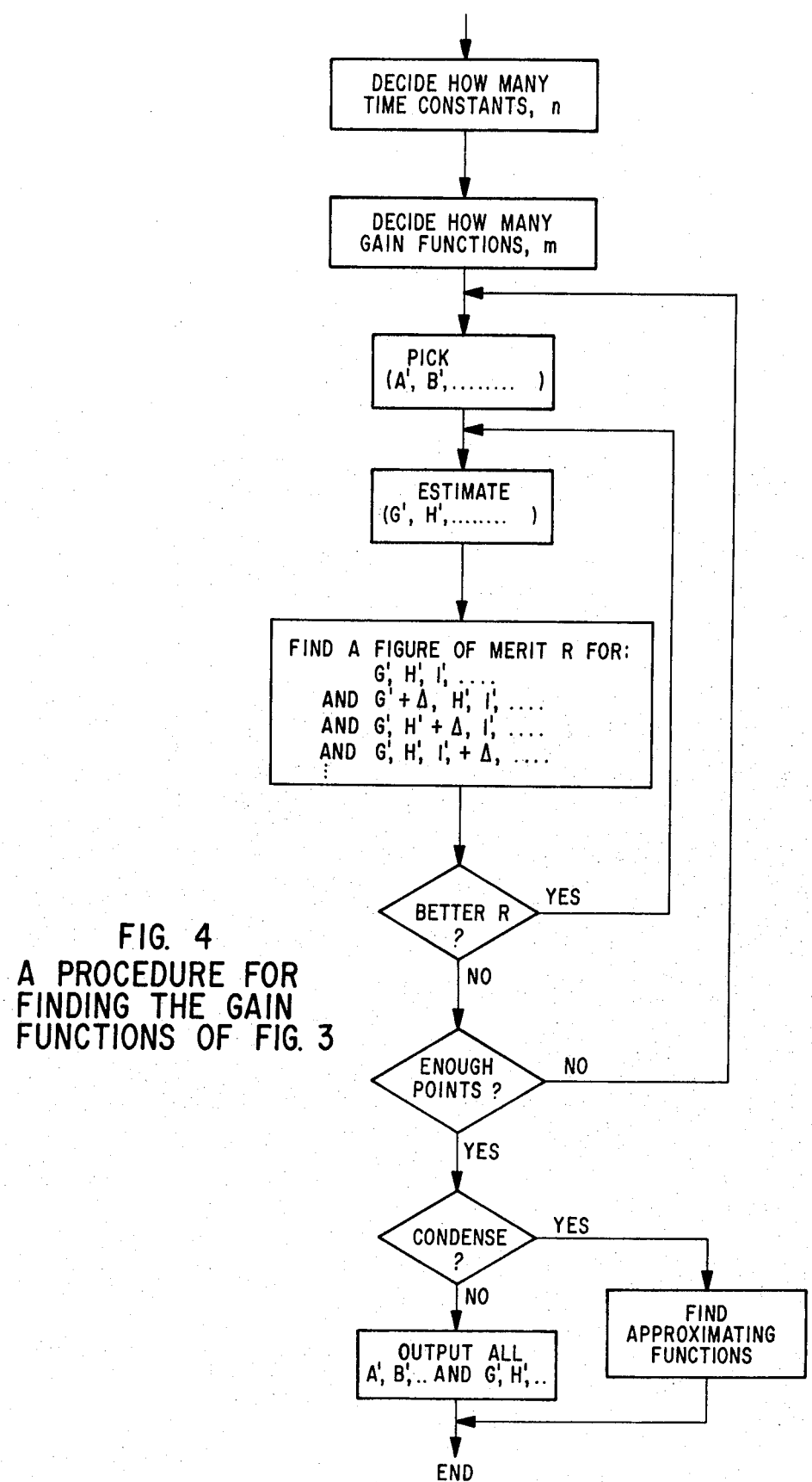
FIG. 4 is a flow chart of a method for approximating the gain optimization functions for the gain optimizer of FIGS. 2 and 3.

FIG. 4 is a flow chart of a procedure for approximating the functions G, H, I, ..., to be implemented by the gain function elements 21, 22, 23, ... These functions are:

G (K, T, A, B, ...),

H (K, T, A, B, ...),

I (K, T, A, B, ...), etc., where T is the sampling time interval.

The procedure assumes that the designer has already identified an optimum desired/actual response. To simplify the procedure it is convenient to temporarily assume that K and T are each equal to unity. K and T can then be neglected while finding a normalized G'(A', B', ...), H'(A', B', ...), I'(A', B', ...), etc. They are each related to the desired G, H, I, ..., in the following way:

$$G(K, T, A, B, \ldots) = \frac{G'(A', B', \ldots)}{KT}$$

$$\text{where } A' = \frac{A}{T}, B' = \frac{B}{T}, \ldots$$

and where H and I are similarly related to H' and I', etc. Thus, the desired functions are readily obtained from the more easily found normalized functions.

The first part of the procedure of FIG. 4 is to let the values of A', B', ... vary simultaneously and independently over a wide range corresponding to the limits of the actual process. For each combination of such values a trial estimate for G', H', I', ... is assumed. For the particular optimum desired/actual response chosen, the values A', B' ... can be used to evaluate the merit of the trial estimates. An iterative process selects new trial estimates until sufficiently meritorius trial estimates are found. Once such meritorius trial estimates are found for the values of G', H', I', ..., a new combination of A', B', ... is selected and the iteration process repeated. In a preferred embodiment for two time constants ten thousand different combinations of A' and B' were used to create a table of values for the G' and H' functions at each of the ten thousand combinations.

The second part of the procedure involves the preparation of either a look-up table embodying the G', H', I', ... functions or the determination of a set of closed form approximating functions. Such approximating functions offer the advantage of compact and efficient storage as well as the ability to interpolate and extrapolate.

The first step in the procedure is to identify the various time constants that are associated with the process 1. The number n of such time constants can be 0, 1, 2...

The second step is to select an appropriate number m of gain functions G, H, I, ... On the one hand, the response time of the process 1 decreases as the number m of gain functions increases. On the other hand, noise sensitivity increases as m increases. The designer must select a suitable compromise for his particular system. Systems where m equals two or three are typical.

The third step is to pick a combination of A', B', ... used in the iteration to follow for finding the values of G', H', I', ...

The fourth step is to form an initial trial estimate for G', H', ...

The fifth step is to find an initial figure of merit R for the initial trial estimate, as well as figures of merit for subsequent trial estimates arrived at by individually changing by some Δ the values of G', H', I', ... Thus, m+1 figures of merit R are computed in association with a given trial estimate of step four. The best R of those m+1 figures of merit is saved. (A method for assigning a figure of merit R is discussed in connection with FIGS. 5, 6, and 7 below.)

The sixth step is to inquire if the best R from those latest m+1 figures of merit is an improvement over the previously saved best such figure of merit. If "yes" it is possible that the best R has not yet been found (and by implication, that the best trial estimate has not yet been found, either). Accordingly, the fourth step is repeated using as the next initial trial estimate new values of G', H', I', ... differing from the previous values by amounts predicted to result in further improvements in the figure of merit.

That is: Let:

P = some arbitrary step size $\Delta R_{G'}$ = the initial figure of merit minus the subsequent figure of merit caused by changing the value of G' by $\Delta$.

$\Delta R_{H'}$ = the initial figure of merit minus the subsequent figure of merit caused by changing the value of H' by $\Delta$.

$\Delta R_{I'}$ = etc.

Then:

$$G'_{NEW} = G'_{OLD} + \frac{P\Delta R_{G'}}{\sqrt{(\Delta R_{G'})^2 + (\Delta R_{H'})^2 + \ldots}}$$

$$H'_{NEW} = H'_{OLD} + \frac{P\Delta R_{H'}}{\sqrt{(\Delta R_{G'})^2 + (\Delta R_{H'})^2 + \ldots}}$$

In the event that the answer to the inquiry of the sixth step is "no," then the best R and its associated best trial estimate have already been found for the current combination selected previously in step three. At the present point in the procedure that best trial estimate and its associated combination of A', B', ... are saved as the next entries in a table.

The seventh step is to inquire if the table has sufficient entries. If not, then the procedure starts over at step three with a new selected combination. Once the table has a sufficient number of entries an eighth step is the decision of whether: (1) to simply output the table, say, in preparation for creating a look-up table defining G', H', I', ... as normalized functions of A', B', ...; or (2) to find a collection of closed form approximating functions for G', H', I', ... If desired, the look-up table or the approximating functions could be adjusted to represent the non-normalized functions of G, H, I, ...

FIG. 5 is a flow chart illustrating a method for predicting overshoot and settling time for a process controlled by a sample control loop, such as that of FIG. 3. The overshoot and settling time thus found can be used to compute an associated value of R. The method is to arithmetically simulate in the time domain the properties of the entire sampled control loop of FIG. 3. A single step-input is applied to the sample control loop. To match the sampling nature of the control loop, an arithmetic model of the process is adjusted after each use corresponding to a sampling time. That is, the results of the previous sampling time are taken as new initial conditions for the next sampling time, and coefficients in the model are changed accordingly. The computational basis for the arithmetic model of the process is a function describing output (say, position) as a function of input and time, assuming initial values for the position, velocity, acceleration, jerk, etc. Independent of the periodic adjustment of the model, the "output" of the arithmetic model is selectively monitored for closely spaced increasing values of time in order to find the greatest amount of overshoot and the settling time.

The first step in the method is to obtain: (1) the combination of A', B', ... selected in step three of the flow chart of FIG. 4; and (2) to obtain one trial estimate from among the several associated trial estimates for the values of G', H', ... used by step five.

The second step is to establish the initial conditions for the arithmetic model of the process 1 and to set equal to zero the value of the variable representing time. A variable N representing the number of sample periods (corresponding to the operation of the sampling mechanism 4) is set equal to one.

The third step commences an iteration loop composed of steps three through nine. Step three uses a series, m items in length, of time shifted error values $E_n$, $E_{n-1}$, ... to compute the result of the transfer function for the gain network 5. The series of error values represents the different outputs from the summing junction 3 during consecutive sample intervals preserved by the delay elements 26, 27, ... During consecutive passes through steps three through nine the values representing the gains of the gain functions in the gain optimizer 6 are kept constant at the trial values supplied at step one.

The fourth step in the method of FIG. 5 is to apply the output of the transfer function found by step three to the arithmetic model representing the process 1. This produces a new output from the process which is used to find $E_{n+1}$.

The fifth step is a test concerning the peak value of the computed actual output from the process 1. The purpose of the test is to ascertain the worst amount of overshoot. Step five will be further discussed in detail below.

The sixth step is a test to determine if the computed output from the process 1 has reached a value within the preselected tolerance band. The value of the step-input being applied determines the final value that the output of the process 1 should eventually become. The tolerance band is simply a region about that final value of plus or minus a certain percentage. When an arbitrary number, say fifty, of consecutive computed outputs are within the tolerance band the output of the process 1 will be considered to have settled.

Assuming that the output has not yet settled, step seven is to increment by one the variable N representing the number of samples occurring so far.

Step eight is the computation of the next error value.

Step nine is the replacement of the previous conditions describing the arithmetic model for the process 1 with new conditions based upon the latest output from the process (position, velocity, acceleration, etc). Following step nine step three is repeated with these new conditions and the iterative process continues until the answer to the check performed by step six is "yes."

Returning briefly now to step five, a change in the sign of velocity of the process output indicates that a peak in the output has occurred. Such a peak occurs within the interval bounded by the two samples whose velocities had opposite signs. Step five watches for such changes in sign and when one occurs temporarily interrupts the normal iteration process. During the interruption step five utilizes the arithmetic model of the process to find the local maximum or minimum within the interval. This is desirable, since the actual maximum or minimum typically does not occur at a sampling point. Once the peak has been located it is stored for future use in determining the largest amount of overshoot. If this peak value exceeds the tolerance the difference is a candidate for the "excess overshoot." A stored value representing the excess overshoot has an initial value of zero. If the new candidate's value is larger in absolute value than the presently stored value, then the presently stored value is replaced by the candidate. Once the greatest value of excess overshoot has been located and stored, the interruption is terminated and the normal iterative process of steps three through nine resumes.

Step 10 is reached when step 6 determines that the output has settled. Step 10 computes a figure of merit R from the excess overshoot and the time required for settling to occur.

FIG. 6 graphically illustrates the notions of settling time and excess overshoot discussed in connection with FIG. 5. A curve 141 illustrates the simulated actual/desired response obtained by the flow chart of FIG. 5 for a two time constant, two gain situation (m=n=2), assuming $A'=3$, $B'=1$, $G'=1.5$, $H'=-1$. The amount of overshoot in excess of the tolerance or settling band is labeled "excess overshoot" and the time required to get and stay within the settling band is labeled "settling time." For the curve 141 the settling time is nonoptimum. A curve 142 illustrates the response obtained by changing $G'$ and $H'$ to 1.567 and $-1.250$ respectively. There is no excess overshoot and the settling time is minimized. In a preferred embodiment the figure of merit R is computed by the following equation:

$$R = (100 \cdot \text{excess overshoot} + 1) \cdot \text{settling time}$$

This method of computing R causes R to be large when either the excess overshoot or the settling time is large. Similarly, a small R is indicative of small excess overshoots and response times.

FIG. 7 illustrates a possible surface 64 obtained by plotting R as a function of $G'$ and $H'$ for the case where m=2 (two gains). The surface 64 is determined by the combination of $A'$, $B'$, ... which was selected in the third step of the procedure of FIG. 4 (a different combination determines a difference surface). There exists one combination of $G'$, $H'$, namely $G^*$ and $H^*$, which locate a point 65 which is a global (i.e., absolute) minimum of the surface 64. Because $G^*$ and $H^*$ give rise to a minimum R, they also give rise to the minimum excess overshoot and response time, and therefore to the optimum response. For the two gain case the fourth, fifth and sixth step of the procedure of FIG. 4 search the surface 64 for the point 65 which yields $G^*$ and $H^*$. A similar situation exists for finding $G^*$, $H^*$, $I^*$, ... where there are three or more gains.

Once $G^* H^*$, $I^*$, ... have been found they are stored with the current combination of $A'$, $B'$, ... New $G^*$, $H^*$, $I^*$, ... are found and stored for each other combination of $A'$, $B'$, ... as indicated in FIG. 4. This collection of values of $A'$, $B'$, ... with their associated values for $G^*$, $H^*$, $I^*$, ... constitute a table of discrete numerical values for the gain optimization functions of FIG. 3.

The gain optimization functions can be utilized either by using a look-up table or by evaluating some closed form representation that closely approximates the table of discrete numerical values generated by the procedure of FIG. 4. Methods for finding such approximating equations are well known to those skilled in the art of numerical analysis. Depending upon the number of time constants for the process 1 the approximating equations would represent a curve (n=1), a surface (n=2), or a density function (n=3), etc. The number of gain elements m in the gain optimizer 6 determine the number of such "curve fits," i.e., one for each of G, H, I ...

For processes described by $$\frac{\text{Out}(s)}{\text{In}(s)} = \frac{Kab}{s(s+a)(s+b)}$$

used with a gain network and gain optimizer of two gains a set of approximating functions for G and H have been determined over a wide range of typical relationships between the time constants and the sampling period. Note that for the types of processes under consideration (i.e., those whose impulse reponse are as described in connection with FIG. 2) the time constant with largest value has the greatest effect. It will be shown below that the approximating functions need only be described over a range of ratios between the time constants and the sampling interval.

When the sampling period is large compared to the largest time constant, the response of the control loop is limited primarily by the sampling period. That is, the largest time constant plays a small part in determining the actual response whenever it is less than, say, one-tenth the value of the sampling period. To be conservative, a lower limit of one twenieth was assumed for that ratio.

On the other hand, when the sampling period is small compared to the largest time constant, the response of the control loop is limited primarily by the largest time constant. That is, the sampling period plays a small part in determining the actual response whenever it is less than, say, one tenth the value of the largest time constant. To be conservative, an upper limit of twenty was assumed for the ratio of largest time constant to the sampling period.

If the upper limit of the ratio is twenty then situations needing an upper limit of twenty-one could be handled by disregarding every other sample, which effectively doubles the sampling period. Then the new ratio is twenty-one halves, which means the largest time constant is still the limiting factor; little performance will be sacrificed by doubling the sampling period. Thus the range of the ratio of time constants to sampling period for the look-up table need not extend beyond 0.05 to 20.0, which is the same as a maximum ratio of 400:1 between any two time constants. This greatly reduces the size of the look-up table and the difficulty in finding the approximating functions. Since $A'=A/T$, etc., the range for $A'$, $B'$, ... is also 0.05 to 20.0.

The look-up table needs to be filled with enough values such that (1) the range is covered, and (2) there are no empty spots. For $A'$ and $B'$ ranging from 0.05 to 20.0 a suitable number of combinations is ten thousand. In the two time constant case, $A'$ and $B'$ were picked according to the following equations. For all combinations of some intermediate variables J and P, J ranges from one to two hundred by one and P ranges from one to fifty by one.

$$A' = \frac{\{(0.05)(1.0304)^J\}^2}{\sqrt{1 + \{(0.0009)(1.148)^P\}^2}} \quad B' = A'(0.0009)(1.148)^P$$

The geometrical nature implied by the above equations produces successive values of $\sqrt{(A')^2+(B')^2}$ and $B'/A'$ that are each fixed percentages of their respective predecessors. This produces usefully spaced samples along radials from the origin.

It was noticed that in the two time constant case, the value of G'+H' varies nearly exponentially with A' and B', and that the value of H'/(G'+H') varies nearly linearly with A' and B'. Further, it was found that approximating the intermediate functions G'+H' and H'/(G'+H') was more convenient than approximating G' and H' directly. G' and H' are easily found from the intermediate functions, however.

Least squares curve fitting techniques were used to find coefficients for functions which exhibited the above-mentioned exponential and linear behavior. FIG. 8 is a plot of the approximated G function. (The axes have been un-normalized to make the plot correspond to G, rather than to G'.) Similarly, FIG. 9 is a plot of the approximated H function.

The approximating functions G and H are:

$$H = \frac{XY}{KT} \text{ and } G = \frac{X(1-Y)}{KT}$$

where K and T are the previously defined scale factor and sampling interval, respectively, and X and Y are intermediate variables defined as follows:

$$X = C_1 + C_2U + C_3U^2 + C_4U^8 + C_5U^{32} + C_6V + C_7UV + C_8U^2W + C_9U^8W + C_{10}U^2W^5$$

and $$Y = C_{11} + C_{12}Q + C_{13}U^{32} + C_{14}QV$$

where $$Q = ((A/T)^2 + (B/T)^2)^{\frac{1}{2}}$$
$$U = e^{-Q/16}$$
$$V = AB/(A^2 + B^2)$$
$$W = e^{-6V}$$

and where:

$C_1 = .113485170$
$C_2 = -.289529320$
$C_3 = .447171990$
$C_4 = .070699409$
$C_5 = .163454920$
$C_6 = -.061802410$
$C_7 = -.008825403$
$C_8 = .183441100$
$C_9 = -.207696230$
$C_{10} = -.002708636$
$C_{11} = -.005967884$
$C_{12} = -.831127400$
$C_{13} = -.183300580$
$C_{14} = -.156580920$

In contrast to the general case described by FIG. 3, FIG. 10 is a block diagram for a specific sampled control loop controlling a process 1 describable by the equation:

$$\frac{Out(s)}{In(s)} = \frac{Kab}{s(s+a)(s+b)}$$

A gain network 51 implements a transfer function that relates an input error signal 143 to a process control signal 139 through multiplier elements 58 and 59 in conjunction with a single delay element 57. A summing element 60 forms a signal corresponding to $GE_N + HE_{N-1}$, which is applied to a zero order hold circuit 18 whose output is in turn applied to a linearizer 19 whose output is the process control signal 139.

A gain optimizer 52 includes a period measuring device 20 responsive to the sampling mechanism 4. A G approximating function element 55 and an H approximating function element 56 respond to the output of the period measuring device 20, to the value 53 of the scale factor K, and to the values 54 of the process time constants A and B. The output of the G and H approximating function elements 55 and 56 respectively control the multiplication factors for the multiplier elements 58 and 59.

The remaining portion of the block diagram of FIG. 10 corresponds to the block diagram of FIG. 3.

In FIGS. 11 and 12 to follow, a general analog method and a general digital method are shown for implementing the gain optimizer 52. Each of these methods has a corresponding technique (i.e., either an analog one or a digital one) for implementing the gain network 51.

FIGS. 11A and 11B are generalized schematic diagrams for a circuit providing an analog implementation of the particular approximating functions described in connection with FIGS. 8 and 9. Taken as a whole, FIGS. 11A and 11B describe an analog circuit corresponding to gain function elements 55 and 56 of FIG. 10.

Analog representations of A(78), B(80), T(79), and K(81) enter the circuit of FIG. 11 and are combined as shown by the various circuit elements. These elements include multiplier elements 71, divider elements 72, exponential amplifiers 73, square root elements 74, gain elements 75 and summing junctions 76. The resultant analog G output 82 and analog H output 83 correspond to the outputs of the G approximating function element 55 and the H approximating element function 56, respectively.

FIG. 12 is a block diagram for a circuit providing a digital implementation of the G and H approximating function elements 55 and 56 of FIG. 10. The inputs to the circuit are digital representations of A(84), B(85), K(86) and T(87). A(84) and B(85) are each divided by T(87) to form an address bus for read-only memories (ROM). A ROM 91 storing values for the G' function and a ROM 92 storing values for the H' function convert this address to respective numerical G' and H' values which appear on their respective data buses. The G' and H' values are then divided by the quantity KT to become a digital G output 95 and digital H output 96.

FIG. 13 is a block diagram of an example sampled control loop constructed in accordance with a preferred embodiment of the invention. The example control loop controls a process 102 whose actuating device is a motor 97 whose output shaft 98 drives a load (not shown). A motor controller 104 controls the speed and direction of the motor 97.

The position of the output shaft 98 is sensed by a transducer mechanism 103 including a slotted disc 99 coupled to the output shaft 98. The slotted disc cooperates with a quadrature hole detector 100 whose output 145 is accumulated by an up-down counter 101 to generate a measured position signal 144. In addition, the output 145 from the quadrature hole detector 100 exhibits a varying sampling interval that ensues as the speed of the motor changes. The output 145 is supplied to a gain optimizer which produces optimum gain information 146 in accordance with the variations in motor speed.

The measured position signal 144 is combined by a summing junction 3 with a desired position signal 147 to produce an error signal 148. Error signal 148 and optimum gain information 146 are used by a gain network 5 to produce an optimum process control signal 149 which is supplied to the motor controller 104.

The gain optimizer in FIG. 13 is shown with sampling interval information as the only input because K, A, B, . . . have been assumed constant. This may, of course, be otherwise if these are also dynamically changing.

The control loop of FIG. 13 is an example where the sampling interval varies. Such a position control loop could not be optimally controlled by the circuit of FIG. 1 because that circuit requires a constant sampling interval. The gain optimizer 6, however, uses the sampling interval as an input for dynamically adjusting the gain network 5 to maintain optimum response, regardless of the sampling interval. Many processes represented by FIG. 13 which heretofore were not controllable with the prior art may now be controlled with the application of gain optimizer 6. Processes for which the sampling interval varied slightly and were able to use a control loop like that of FIG. 1 may now be improved with the application of gain optimizer 6.

FIG. 14 is a block diagram of a sampled control loop for controlling the position of a wheeled vehicle running upon a track. In this example an electronic distance meter 108 is optically coupled to a reflector 107 mounted on a motorized ore car capable of carrying a variable mass 106.

The electronic distance meter 108 functions as a transducer that samples the distance several times a second. The electronic distance meter supplies distance information 109 and time information 110. The time information 110 is the elapsed time interval between distance measurements, and is supplied to a gain optimizer 6. The elapsed time interval information 110 is not always constant, due to changing environmental conditions surrounding the distance measurement operation.

A summing junction 3 combines a desired position signal from an external source (not shown) with the distance 109 to create an error signal 151 supplied to a gain network 5.

The gain optimizer 6 combines the time interval information 110 with mass information 152 supplied from an external source (not shown). Mass information 152 represents the value of mass 106, and constitutes the dominant time constant in the system. The gain optimizer 6 combines the mass information 152 with the time interval information 110 to produce a gain signal 153 that causes the gain network 5 to operate at the optimum gain. The gain network 5 produces a process control signal 154 which activates the motor controller 113.

FIG. 14 represents control loops where the time constants of the process are not constant. The control loop of FIG. 1 is not able to optimally control such a process because it requires that the process time constants do not change. The application of gain optimizer 6 causes the response of the control loop of FIG. 14 to be optimum regardless of the changing mass 106 of the ore car 105 and the changing sampling interval 110 of the electronic distance meter 108.

FIG. 15 is a block diagram of a nested pair of example sampled control loops for controlling the temperature and volume of a stream of liquid.

A motor 115 has mounted upon its output shaft a left-hand mixing valve 118 and right-hand mixing valve 119. One mixing valve opens as the other mixing valve closes, and each offsets the other. A cold water pipe 116 supplies cold water to the input side of the left-hand mixing valve 118, and a hot water pipe 117 supplies hot water to the input side of the right-hand mixing valve 119. A manifold 155 combines the discharge of the mixing valves 118 and 119 and supplies it to the input side of a throttling valve 121.

Because of the complementary nature of the two mixing valves 118 and 119 they induce no throttling action, assuming equal diameters for the hot and cold water pipes 116 and 117, and equal supply pressures therein.

The effect of motor 115 is to change the temperature of the water in the manifold 155. The temperature is measured by a temperature probe 120 located downstream in the manifold 155. It is assumed that the temperature measurement is performed by a sampling device; repeated momentary closure of a switch 124A corresponds to the sampling rate. There is a time constant associated with temperature change within the manifold and its value is represented by a thermal time constant signal 162 supplied to a gain optimizer 123.

The value of a propagation delay for the mixed hot and cold water ahead of the temperature probe 120 is determined by the rate at which the water flows in the manifold. That in turn is affected by the throttling valve 121, which is controlled by a motor 125.

A flow meter 126 is located in series with the discharge 133 from the throttling valve 121. The nature of the flow meter is to provide one instance of contact closure of switches 160A, 160B, and 160C for each unit volume of water passing through the flow meter 126. A counter 127 accumulates the contact closures of the switch 160A to create a measured volume signal 156.

External controlling circuitry (not shown) supplies a desired temperature signal 159 and a desired volume signal 157. These two signals determine the amount of water to be supplied and its temperature. Each of these parameters is controlled by a separate sampled control loop.

The temperature control loop combines the desired temperature signal 159 and measured temperature signal 158 in summing junction 128 to produce a temperature error signal 162, which in turn is supplied to a gain network 122. A switch 124B opens and closes in step with switch 124A. This supplies temperature sampling rate information to the gain optimizer 123.

A switch 160C operates in step with the switch 160A to provide volume control sampling interval information to the gain optimizer 123. That information is directly proportional to the propagation delay of the water through the manifold 155. The gain optimizer 123 combines the temperature sampling interval, the thermal time constant, and the propagation delay, through some G and H approximating functions to produce gain information signals supplied to the gain network 122. The gain network 122 produces a temperature process control signal 164.

In the volume control loop a summing junction 129 combines the desired volume signal 157 with a measured volume signal 156 to produce a volume error signal 165, which is supplied to a gain network 131. A switch 160B operates in step with the switch 160A to provide sampling interval information to a gain optimizer 130, which in turn produces gain information 166. The gain network 131 combines the volume error signal 165 and the gain information 166 to produce an optimized volume process control signal 167 that is supplied to a motor controller 132. In turn, the motor control 132 actuates the throttling valve 121 through a motor 125.

In the example of FIG. 15 changing the flow rates in the volume control loop dynamically alters the propagation delay for the temperature control loop. The gain optimizer 123 compensates for these changes and maintains optimum response for the temperature control loop.

FIG. 16 is an example flow chart of a program, for execution by either a microprocessor or a computer, to implement a sampled control loop constructed in accordance with a preferred embodiment of the invention. The example flow chart is usable with the example processes shown in FIGS. 13, 14 and 15.

The first step is to characterize the process by determining the time constants and any other parameters of interest (such as propagation delays) associated with the process. If these time constants and parameters do not change dynamically as the process is in operation, they may be determined once at the outset. If, however, they do change dynamically they can be periodically redetermined or monitored as is appropriate.

The second step is to determine the desired output from the process. That value could be supplied by an operator of the process, from an external mechanism (not shown) or it could be decided upon entirely by the present program itself.

The third step is to check the status of the sampling mechanism to determine if a new sample has been taken. If the answer to this question is "no," the third step is repeated. If the answer is "yes" then step four is executed.

Step four determines the latest sampling interval by inputting a value from a period measuring device, such as a counter. If the sampling interval is constant this step and step five may be executed at the outset of the flow chart and skipped in the future.

Step five simply reinitializes the period measuring device, or resets the counter, as the case may be.

Step six is to read the measured output from the transducer.

The seventh step is to compute the difference $E_n$ between the actual and desired outputs.

The eighth step is to evaluate the approximating G and H functions for the values of T, K, A, B . . . , and propagation delay found in the first and fourth steps. If all parameters are constant, this step may also be performed once at the outset and skipped in the future.

The ninth step computes an intermediate control signal from G, H, $E_n$ and $E_{n-1}$.

The tenth step passes the intermediate control signal through a linearizer, if needed.

The eleventh step sends the output of the linearizer to the process.

The twelfth step is to replace $E_{n-1}$ with $E_n$ and return to the second step.

FIG. 17 is a block diagram of a sampled control loop circuit constructed in accordance with an alternate embodiment of the invention. The circuit produces a process control signal 168 that actuates a process 169. An output transducer 170 is coupled to the actual output 172 of the process 169. In a position control loop the output of the transducer 170 would represent the position of the object being controlled. Another transducer 171 is also coupled to the actual output 172. The purpose of this transducer is to measure the first derivative of the actual output 172. In a position control loop the output of the transducer 171 would represent the velocity of the object being controlled.

A desired output signal 183 is supplied to the sampled control loop from some external source (not shown). A summing junction 175 combines the desired output signal 183 with the output of the transducer 170 to produce an error signal 187, which is applied through a sampling mechanism 176A to a multiplier element 177.

The other transducer 171 is coupled to another multiplier element 178 through a switch 176B that operates in step with sampling mechanism 176A. The output of multiplier elements 177 and 178 are combined by a summing junction 179 to produce a signal applied to the input of a zero order hold circuit 181. In turn, the output of the zero order hold circuit 181 is linearized by a linearizer 182, to become the process control signal 168.

The multiplier elements 177 and 178, the summing junction 179, the zero order hold circuit 181, and the linearizer 182 constitute a gain network 180 that corresponds in its purpose to the gain network 5 of FIG. 3.

Multiplier elements 177 and 178 each multiply their respective input signals by factors determined by respective approximated G and H functions implemented by a gain optimizer 188, corresponding in purpose to the gain optimizer 6 of FIG. 3.

Within the gain optimizer 188 a switch 176C, operating in step with the sampling mechanism 176A, provides sampling interval information to a period measuring device 186. In turn, period measuring device 186 supplies a value T to each of an approximate H function element 184 and an approximate G function element 185. Each of elements 184 and 185 also receive as inputs the scale factor K and the time constants A and B.

The sampled control loop of FIG. 17 differs from that of FIG. 10 in that the control loop of FIG. 17 has multiple transducers and has a differently structured gain network. The delay element 57 of FIG. 10 enables information concerning the time rate of change of the measured output to be computed, whereas the transducer 171 of FIG. 17 enables the same information to be measured directly. Thus, FIGS. 10 and 17 differ in the way in which the time rate of change of the actual output is determined, but are similar in that they both use this information in the same way. For this reason a procedure similar to that used to generate the approximating G function 55 and H function 56 may be used for generating an approximating G function 185 and H function 184. As does the control loop of FIG. 10, the control loop of FIG. 17 remains optimized for dynamically changing sampling interval T, scale factor K, and process time constants A and B. The gain network of FIG. 17 is also similar in that the propagation delay in the transducer, as well as optimization criteria, may also be included as inputs to the approximate G function element 185 and approximate H function element 184.

The Appendix contains a listing of a program partially implementing the flow chart of FIG. 16. The program is for a position control loop and can be used, for example, to control the position of a motor-driven wheeled object upon a track. The user specifies the length of the track.

The program requests the user to specify an arbitrary number of locations along the track at which the wheeled object is to be positioned. Once the program is in operation the object is successively positioned in sequence at each of those locations.

The program automatically characterizes the process to learn the dominant time constant of the system. It does this by exercising the process some user selected number of times. During each such exercise the program monitors the difference between an applied stimulus and the response. From that it finds the time constant. The program assumes that there is only one such time constant to be found. Once characterization is complete the approximation values for G and H are computed. These values, along with the scale factor and time constants, are assumed to remain unchanged.

The program assumes that an optimum response is one having not more than one percent overshoot. Further, it is assumed that a propagation delay exists and is equal to sixty percent of the sampling interval.

A user selectable second time constant is incorporated into the program. This second time constant is associated with a "filter" assumed to be just ahead of the linearizer for the process. Actually, the "filter" is implemented by the program, which queries the user to learn the value of its time constant.

The transducer is assumed to be a Hewlett-Packard (HP) model 3850A Industrial Distance Meter. A reflector for the HP 3850A is mounted upon the wheeled object. The program assumes a fixed sampling rate of nine samples per second.

The program itself runs on an HP 9825 Desktop Computer, which is interfaced via the Hewlett-Packard Interface Bus (HP-IB) to an HP 59303 Digital to Analog Converter (DAC). The output of the DAC may be connected to the input of a regenerative motor controller such as the G.E. 6VH-RB2100 which controls a DC motor such as the G.E. 6VHM-4100A761A1. The DC motor is connected via a mechanical linkage to an object being controlled. A reflector mounted on the object moves in the line of sight of the HP 3850A Industrial Distance Meter. The HP 3850A is connected to an HP 38001 interface box via an I/O cable. The HP 38001 is connected to the HP 9825 computer via HP-IB.

The program assumes that the select code of the DAC is set at 18 and that the select code of the HP 38001 is 17.

In addition, the program requires that the HP 9825 be connected to an HP 98035A real time clock, and that an HP 98210 "String-Advanced Programming ROM" and an HP 98216 "9872A Plotter-General I/O-Extended I/O ROM" be installed.

Referring to the listing in the Appendix, the program is organized as follows.

Lines 0-15 initialize various variables, arrays, and peripherals.

Lines 16-30 constitute the main program. The first step is to call a subroutine "characterize" (lines 42-91) which determines the linearizer, K, T and the process time constant due to mass. The second step is to call a subroutine "optimize" (lines 31-41) which computes approximating G and H values for the parameters found in "characterize." The third step is to fetch a desired distance from an array. The fourth step is to call a subroutine "Control" (lines 92-98) which causes the object to be positioned. Lines 99-100 comprise a subroutine for implementing a digital filter. Lines 101-113 comprise a support subroutine for "characterize" which prevents the object from running past its stops.

Lines 114-116 comprise a subroutine that translates the generic I/O terms of the remaining portions of the program to specific I/O commands for the particular DAC being used. Line 117 is an emergency stopping routine in case the HP 3850A fails. Lines 38-41 gets the measured output from the HP 3850A.

APPENDIX

```
0: on err "stop";time 150
1: dim U[14],X[14];trk 1;ldk 3
2: .11348517}U[1];-.28952932}U[2];.44717199}U[3]
3: .070699409}U[4];.16345492}U[5];-.06180241}U[6]
4: -.008825403}U[7];.18344111}U[8];-.20769623}U[9]
5: -.002708636}U[10];-.005967884}U[11]
6: -.8311274}U[12];.18330058}U[13];-.15658092}U[14]
7: dim L[-200:200],Y[7];0}G}H}N;1}U;.3}R;cmd 7,"U3","E0";cll 'WRT'(0)
8: ent "% OF TOP SPEED DESIRED ?",R;.01R}R
9: dim G[-50:50],H[-50:50],R[30],F[500],T[500],Z[4],B$[2];sfg 14
10: ent "# OF STATIONS ?",V;for I=1 to V;ent "LOCATION",R[I];next I
11: sfg 3;for L=-200 to 200;.05L}L[L];next L;-9.99}L[-200];9.99}L[200];fxd 3
12: oni 9,"F";wrt 9,"U1P20/U1G";cmd 7,"U3","E0";eir 9
13: fmt 1,f5.2;fmt 2,f6.0,f5.0,f6.0
14: clr 717;wtb 717,"mlkj9n8765n43210";trg 717;wtb 717,0;wait 300
15: wtb 717,1;wait 300;wtb 717,0;wait 300;wtb 717,2;0}S
16: fxd 0;cll 'CHARACTORIZE'
17: spc ;prt "      IF      ";prt "You Want To"
18: prt "Alter Parameters";prt "Push f0";spc ;1}W
19: spc ;prt "OPTIMUM CONTROL HAS:"
20: cll 'OPTIMIZE';fxd 3;prt "n GAIN=",G,"n-1 GAIN=",H
21: spc ;0}F;trk 1;rcf 1,L[*],Y[*],G,H,N,U,R
22: if not flg12;gto +5
23: cfg 12
24: enp "FILTER TIME CONSTANT ?",Y[1];if Y[1]<0 or Y[1]>20Z[2];beep;gto +0
25: spc ;enp "MAX. ALLOWABLE ERROR (mm) ?",Z;spc ;if Z<0;beep;gto +0
26: gto -7
27: sfg 3;fxd 0;R[W]}X;if X>Y[3] or X<Y[2];beep;gto +0
28: W+1}W;if W>V;1}W
29: eir 9;cll 'CONTROL';beep
30: fxd 2;gto -8
31: "OPTIMIZE":Z[1]/Z[2]}X;Y[1]/Z[2]}Y;1}X[1];XY/(XX+YY}G)}H;√G}G
32: exp(-.02/Y[1])}N;1-N}U
33: exp(-G/16)}X[2];X[2]X[2]}X[3];X[3]X[3]X[3]X[3]}X[4]
```

```
34: X[4]X[4]X[4]X[4]}X[5];H}X[6];HX[2]}X[7];(exp(-6H)}H)X[3]}X[8]
35: HX[4]}X[9];HHHHHX[3]}X[10];1}X[11];G}X[12];X[5]}X[13];GX[6]}X[14];0}G}H
36: for I=1 to 10;G+U[I]X[I]}G;next I;for I=11 to 14;H+U[I]X[I]}H;next I
37: GH}H;G-H}G;G/Z[2]Z[3]}G;H/Z[2]Z[3]}H;ret
38: "d":0}p1
39: if bit(6,rds(717))=1;red 717.2,T,D,A;ret
40: p1+1}p1;if p1>10;red 717.2,T,D,A;ret
41: gto -2
42: "CHARACTORIZE":9.99}M;for I=1 to 500;0}F[I]}T[I];next I
43: for I=-50 to 50;0}G[I]}H[I];next I
44: trk 0;ldf 1,Y[2],Y[3]
45: ent "CONSTANTS KNOWN ?(if no, cont.)",Y[1];if flg13;gto +3
46: cll 'd';cll 'd';cll 'd';T1e-4}T;enp "mm/sec/volt ?",A;A/20}A
47: spc ;enp "MOTOR TIME    CONSTANT?",B;-AB}B;gto +38
48: ent "CHARACTERIZING RUNS",Q;if Q<1 or Q>1000;beep;gto +0
49: 900}Y[4];1}Y[5];dsp "CHARACTERIZING, 0% DONE"
50: for L=1 to Q;for P=1 to 2;cll 'y';gto "cont"
51: "y":if Y[5]=3;4}Y[5];int(.9Y[6])}Y[4];if I<Y[6];int(.9I)}Y[4]
52: for I=1 to 30;cll 'd';D}F[I];if A>84131;beep;1}I
53: next I;20M}S;for I=26 to 30;F[25]+F[I]}F[25]
54: next I;F[25]/6}B;0}F[1]}T[1]
55: 20M}S;for I=2 to Y[4];cll 'd';if A>84131;MZ1e99}D;2}I
56: D-B}F[I];(T1e-4}T)+T[I-1]}T[I];if Y[5](100L+10P+I)<114;F[I]M}Z;gto +3
57: if Y[5]=1;MZ1e99}D;2}Y[5]
58: if D>Y[3] or D<Y[2];gto "FIX"
59: next I
60: 0}S;5}J;0}0}S
61: if J>.5Y[4];0}S}0;cll 'WRT'(0);spc ;prt "TRACK TOO SHORT";gto 42
62: if abs(2F[J-1]-F[J-2]-F[J]}K)>.05abs(F[J]) and K>3;J+1}J;gto -1
63: 0}A}B}C}D;for K=J to Y[4]
64: A+F[K]}A;B+T[K]}B;C+F[K]T[K]}C;D+T[K]T[K]}D;next K
65: BB-D(Y[4]-J+1}G)}E
66: (BA-GC)/E}G[(Q+1-L)(3-2P)}F];(BC-AD)/E}H[F];ret
67: "cont":fxd 1;dsp "CHARACTERIZING",100(L-1+.5P)/Q,"% DONE"
68: -M}M;next P;sgn(M)(Q-L)(Q-L)/.1QQ}M;next L
69: cfg 3
70: G[Q]}M;M/abs(M)}Z;if abs(G[Q])>abs(G[-Q]);G[-Q]}M;-M/abs(M)}Z
71: Zabs(M)/200}A;-Q}K;for I=-200 to 200
72: if K>Q;gto +5
73: sgn(K)KK/.1QQ}J;sgn(K+1)(K+1)(K+1)/.1QQ}G
74: (G[K+1]-G[K])/(G-J)}L;if ZL<0;-L}L
75: (IA-G[K])/L}L;if L>G-J;K+1}K;gto -3
76: J+L}L;if abs(L)>9.99;9.99abs(L)/L}L
77: L}L[I];dsp "LINEARIZING",(I+200)/4,"% DONE"
78: next I;sfg 3;eir 9;0}B}G}W}X}Y}Z
79: for I=-10 to 10;if abs(G[I])<.1abs(M);gto +2
80: -H[I]/G[I]}B;G+1}G;X+B(.0999II}H)}X;Y+B}Y;Z+H}Z;W+HH}W
81: next I;-A(XZ-YW)/(ZZ-GW)}B;fxd 3
82: spc ;prt "MOTOR TIME    CONSTANT=",-B/A;spc
83: fxd 3;spc ;prt "MOTOR GAIN=",abs(M)/10,"mm/sec/volt"
84: if (-B/A}Z[1])<T;gto +4
85: spc ;prt "****************";spc ;0}Y[1]
86: prt "NO FILTER      RECOMENDED";spc
87: prt "****************";spc
88: enp "DESIRED FILTER  TIME CONSTANT?",Y[1];abs(Y[1])}Y[1]
89: if Y[1]/T>20;beep;dsp "TOO LARGE";wait 1000;gto -1
90: spc ;enp "MAX. ALLOWABLE  ERROR (mm) ?",Z;if Z<0;beep;gto +0
91: spc ;T}Z[2];A}Z[3];ret
92: "CONTROL":cll 'd';if A>84131;0}S;gto +6
93: G(X-D}E)+HF}Y;if abs(Y)>200;abs(Y)200/Y}Y
94: Y}S
95: E}F;dsp D
96: if (abs(F)+abs(P)+abs(Q))/3<Z;cll 'WRT'(0);cfg 3;ret
97: P}Q;F}P;gto "CONTROL"
98: dsp "-----BEAM BREAK-----";beep;gto "CONTROL"
99: "F":if not flg3;cll 'WRT'(0);0}0;iret
100: NO+US}0;cll 'WRT'(L[0]);eir 9;iret
101: "FIX":if MZ>0 and D>Y[3];cll 'WRT'(0);0}0;-99.5abs(M)/M}Y[7];gto +8
102: if MZ<0 and D<Y[2];cll 'WRT'(0);0}0;-99.5abs(M)/M}Y[7];gto +2
103: gto 59
104: if Y[5]=2;I}Y[6];0}I;if abs(D)<1e9;3}Y[5];2Y[7]}Y[7]
```

```
105: cll 'd';if A>84131;beep;0}S;gto +3
106: Y[7]}S;if D>Y[3];0}S;gto "y"
107: if Y[5]=3;I+1}I
108: gto -3
109: if Y[5]=2;I}Y[6];0}I;if abs(D)<1e9;3}Y[5];2Y[7]}Y[7]
110: cll 'd';if A>84131;0}S;beep;gto +3
111: Y[7]}S;if D<Y[2];0}S;gto "y"
112: if Y[5]=3;I+1}I
113: gto -3
114: "WRT":fmt 1,f5.2
115: Rp1}p2;if (abs(p2)}p3)>9.9;9.9sgn(p2)}p2
116: wrt 718.1,p2;ret
117: "stop":cll 'WRT'(0);fti (rom)}B$;dsp "error",B$[2],ern,"in line",erl;end
```

I claim:

1. An optimizer for a sampled control loop for controlling a process having a process gain K and with which there are associated process parameters that include a sampling interval T and a time constant A, the optimizer comprising:

input means for receiving a signal indicative of the value of a process parameter;

optimization means coupled to the input means for producing gain control information according to an optimization function F(T, K, A, ...) where F is chosen to minimize the amount of time required for the process to settle within a preselected tolerance band in response to a disturbance in the equilibrium of the process; and output means for generating a gain control signal indicative of the optimized gain control information.

2. A sampling controller for controlling in response to an input control signal a process monitorable by a transducer, having a process gain K and with which there are associated process parameters that include a sampling interval T and a time constant A, the sampling controller comprising:

error signal generation means coupled to the input control signal and to the transducer for producing an error signal corresponding to the difference between the input control signal and the output of the transducer;

sampling means coupled to the error signal and having an output for providing at intervals of time T periodic samples of the error signal;

optimization means having inputs for receiving signals indicative of process parameters that include a sampling interval T and a time constant A, the gain optimization means for producing according to at least two optimization functions G(K, T, A, ...) and H(K, T, A, ...) chosen to minimize the settling time of the process at least two optimal gain control signals; and gain network means coupled to at least two optimal gain control signals and to the error signal for producing according to a transfer function determined by at least two optimal gain control signals a process control signal to optimally change the state of the process in accordance with changes in the error signal.

3. An optimizer for a gain network utilizing a gain M in a sampled control loop for a process with which there are associated a sampling interval T, a process gain K and a time constant of value A, the optimizer comprising:

normalization means, coupled to a signal indicative of the value A of a time constant associated with the process, for producing a normalized time constant signal whose value corresponds to the quotient A/T;

optimization means, coupled to the normalized time constant signal, for producing gain control information m according to a predetermined optimization function m=g(A/T); and scaling means coupled to the gain control information for producing scaled gain control information M=m/KT that corresponds to an optimization function M=G(T, K, A).

4. An optimizer for a gain network having proportional and derivative terms respectively utilizing gains $M_1, M_2, \ldots$ in a sampled control loop for a process with which there are associated a sampling interval T, a process gain K and a time constant of value A, the optimizer comprising:

normalization means, coupled to a signal indicative of the value A of a time constant associated with the process, for producing a normalized time constant signal whose value corresponds to the quotient A/T;

optimization means, coupled to the normalized time constant signal, for producing gain control information $m_1, m_2, \ldots$ according to predetermined optimization functions $m_1=g(A/T)$, $m_2=h(A/T)$, ...; and scaling means coupled to the gain control information for producing scaled gain control information $M_1=m_1/KT$, $M_2=m_2/KT$, ... that corresponds to optimizing functions $M_1=G(T, K, )$, $M_2=H(T, K, A)$, ... for respectively specifying the gains of proportional and derivative terms in a gain network.

5. An optimizer for a gain network utilizing a gain M in a sampled control loop for a process with which there are associated a sampling interval T, a process gain K and time constants of values A, B, ..., the optimizer comprising:

normalization means, coupled to signals indicative of the values A, B, ... of time constants associated with the process, for producing normalized time constant signals whose values correspond to the quotients A/T, B/T, ...;

optimization means, coupled to the normalized time constant signals, for producing gain control information m according to a predetermined optimization function m=g(A/T, B/T, ...); and scaling means coupled to the gain control information for producing scaled gain control information M=m/KT that corresponds to an optimization function M=G(T, K, A, B, ...).

6. An optimizer for a gain network having proportional and derivative terms respectively utilizing gains $M_1, M_2, \ldots$ in a sampled control loop for a process with which there are associated a sampling interval T, a process gain K and time constants of values A, B, ..., the optimizer comprising:

normalization means, coupled to signals indicative of the values A, B, ... of time constants associated with the process, for producing normalized time constant signals whose values correspond to the quotients A/T, B/T, ... ;

optimization means, coupled to the normalized time constant signals, for producing gain control information $m_1$, $m_2$, ... according to predetermined optimization functions $m_1 = g(A/T, B/T, ...)$, $m_2 = h(A/T, B/T, ...)$; and so on; and scaling means coupled to the gain control information for producing scaled gain control information $M_1 = m_1/KT$, $M_2 = m_2/KT$, ... that corresponds to optimizing functions $M_1 = G(T, K, A, B)$, $M_2 = H(T, K, A, B)$, ... for respectively specifying the gains of proportional and derivative terms in a gain network.

7. Apparatus as in claim 3, 4, 5 or 6 further comprising a gain network coupled to the scaled gain control information and to an error signal, the gain network operating upon the error signal wih an optimal transfer function determined by the scaled gain control information to produce a process control signal, whereby the sampled control loop optimally controls the process.

8. Apparatus as in claim 3, 4, 5 or 6 further comprising:
means for measuring the length of the successive sampling intervals and producing a time interval signal whose value represents the most recently measured sampling interval; and wherein
the normalization means is additionally coupled to the time interval signal and the divisor T is the value of the time interval signal; and
the scaling means is additionally coupled to the time interval signal and the divisor KT is the product of K and the value of the time interval signal.

9. Apparatus as in clim 3, 4, 5 or 6 wherein the process gain K is variable, the scaling means is further coupled to a signal representing the value K and the divisor KT is the product of the sampling interval and the current value of the signal representing the value K.

10. Apparatus as in claim 3, 4, 5 or 6 wherein the value of a time constant is variable, and further wherein the normalization means uses the current value of the variable time constant to produce a normalized time constant signal.

11. Apparatus as in claim 3, 4, 5 or 6 wherein the sampled control loop controls the state of the process in accordance with the value of an input control signal and each predetermined optimization function is chosen to minimize the amount of time required for the process to settle within a preselected tolerance band in response to a change in the equilibrium of the process.

12. Apparatus as in claim 1, 2, 3, 4, 5 or 6 wherein the optimization means comprises microprocessor means programmed to evaluate an optimization function.

13. Apparatus as in claim 1, 2, 3, 4, 5 or 6 wherein the optimization means comprises memory means for storing preselected values of the dependent variable of an optimization function, the memory means responsive to the values of a signal representing an independent variable of the optimization function for selecting in accordance therewith a stored preselected value representing the corresponding value of the dependent variable for the optimization function.

14. Apparatus as in claim 1, 2, 3, 4, 5 or 6 wherein the optimization means comprises analog circuit means for producing from an input signal representing an independent variable of an optimization function an output signal whose amplitude represents the dependent variable of the optimization function.

15. A method of optimizing the transfer function of a gain network in a sampled control loop for a process having parameters associated therewith that include a process gain k and a time constant, the method comprising the steps of:
determining the values of the parameters associated with the process;
measuring the sampling interval T between consecutive samples;
evaluating at least one optimization function whose independent variables are T and the parameters to produce at least one dependent variable whose value represents a gain in an optimal transfer function for the gain network;
adjusting at least one gain within the gain network according to the value of such a dependent variable to produce an optimal transfer function.

16. A method as in claim 15 wherein the determining step comprises a one-time determination of the value of at least one of the parameters performed in advance of the remaining steps.

17. A method as in claim 15 wherein the determining step comprises monitoring the process and periodically adjusting the value of at least one of the independent variables representing the parameters.

18. A method as in claim 16 or 17 wherein the parameters further include a propagation delay for a transducer coupled to the process.

19. A method of optimizing the transfer function of a gain network utilizing a gain M in a sampled control loop for a process with which there are associated a sampling interval T, a process gain K and a time constant A, the method comprising the steps of:
normalizing the value of the time constant by dividing the value of the time constant A by the value T of the sampling interval;
evaluating an optimization function $m = g(A/T)$;
scaling m by dividing it by the product KT to produce a quotient M representing an optimum gain; and
adjusting the value of a gain in the gain network in accordance with the value of M produced by the scaling step to produce an optimum transfer function.

20. A method of optimizing the transfer function of a gain network having proportional and derivative terms respectively utilizing gains $M_1$, $M_2$, ... in a sampled control loop for a process with which there are associated a sampling interval T, a process gain K and a time constant A, the method comprising the steps of:
normalizing the value of the time constant by dividing the value of the time constant A by the value T of the sampling interval;
evaluating optimization functions $m_1 = g(A/T)$, $m_2 = h(A/T)$, ... ;
scaling $m_1$, $m_2$, ... by dividing each of them by the product KT to produce quotients $M_1$, $M_2$, ... representing optimum gains; and
adjusting the values of the gains for the proportional and derivative terms in the gain network in accordance with the values of $M_1$, $M_2$, ... produced by the scaling step to produce an optimum transfer function.

21. A method of optimizing the transfer function of a gain network utilizing a gain M in a sampled control loop for a process with which there are associated a sampling interval T, a process gain K and time constants A, B, . . . , the method comprising the steps of:
normalizing the values of the time constants by dividing the value of each time constant A, B, . . . by the value T of the sampling interval;
evaluating an optimization function $m = g(A/T, B/T, \ldots)$;
scaling m by dividing it by the product KT to produce a quotient M representing an optimum gain; and
adjusting the value of a gain in the gain network in accordance with the value of M produced by the scaling step to produce an optimum transfer function.

22. A method of optimizing the transfer function of a gain network having proportional and derivative terms respectively utilizing gains $M_1, M_2, \ldots$ in a sampled control loop for a process with which there are associated a sampling interval T, a process gain K and time constants A, B, . . . , the method comprising the steps of:
normalizing the values of the time constants by dividing the value of each time constant A, B, . . . by the value T of the sampling interval;
evaluating optimization functions $m_1 = g(A/T, B/T, \ldots)$, $m_2 = h(A/T, B/T, \ldots)$;
scaling $m_1, m_2, \ldots$ by dividing each of them by the product KT to produce quotients $M_1, M_2, \ldots$ representing optimum gains; and
adjusting the values of the gains for the proportional and derivative terms in the gain network in accordance with the values of $M_1, M_2, \ldots$ produced by the scaling step to produce an optimum transfer function.

* * * * *

UNITED STATES PATENT AND TRADEMARK OFFICE
CERTIFICATE OF CORRECTION

PATENT NO. : 4,349,868
DATED : September 14, 1982
INVENTOR(S) : Troy L. Brown

It is certified that error appears in the above—identified patent and that said Letters Patent is hereby corrected as shown below:

Column 22, line 44, claim 4, (first occurrence) "(T,K,)" should be --(T,K,A)--;

Column 23, line 40, claim 9, "clim" should be --claim--.

Signed and Sealed this

Twenty-eighth Day of December 1982

[SEAL]

Attest:

GERALD J. MOSSINGHOFF

Attesting Officer       Commissioner of Patents and Trademarks